(12) United States Patent
Hayakawa et al.

(10) Patent No.: US 11,092,800 B2
(45) Date of Patent: Aug. 17, 2021

(54) ADAPTIVE OPTICAL APPARATUS, OPTICAL SYSTEM, AND OPTICAL WAVEFRONT COMPENSATION METHOD

(71) Applicant: KAWASAKI JUKOGYO KABUSHIKI KAISHA, Kobe (JP)

(72) Inventors: Akiyoshi Hayakawa, Nagoya (JP); Ryuji Nagaoka, Kakamigahara (JP); Toru Nagai, Kakamigahara (JP); Fumio Wani, Konan (JP); Tokunari Nishimura, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 106 days.

(21) Appl. No.: 16/687,712

(22) Filed: Nov. 19, 2019

(65) Prior Publication Data

US 2020/0096758 A1    Mar. 26, 2020

Related U.S. Application Data

(63) Continuation of application No. PCT/JP2018/018992, filed on May 16, 2018.

(30) Foreign Application Priority Data

May 19, 2017   (JP) ............................. JP2017-099907

(51) Int. Cl.
  *G02B 5/08*    (2006.01)
  *G02B 26/08*   (2006.01)
(52) U.S. Cl.
  CPC ............ *G02B 26/0825* (2013.01); *G02B 5/08* (2013.01)

(58) Field of Classification Search
  None
  See application file for complete search history.

(56) References Cited

U.S. PATENT DOCUMENTS

| | | | | |
|---|---|---|---|---|
| 4,271,355 A | * | 6/1981 | Wisner | G02B 26/06 250/201.9 |
| 5,198,653 A | * | 3/1993 | Shen | G01J 9/00 250/201.9 |
| 2012/0287400 A1 | * | 11/2012 | Utagawa | A61B 3/12 351/206 |

(Continued)

FOREIGN PATENT DOCUMENTS

JP          2000-68934 A        3/2000

*Primary Examiner* — Jennifer D. Carruth
(74) *Attorney, Agent, or Firm* — Xsensus LLP

(57) ABSTRACT

An adaptive optical apparatus includes a first deformable mirror that includes a reflecting surface reflecting light having propagated through an atmosphere, and a drive having a plurality of drive elements and changing an uneven shape of the reflecting surface. There is also a second deformable mirror that includes a reflecting surface reflecting the light from the first deformable mirror and a drive unit having a plurality of drive elements and changing an uneven shape of the reflecting surface. There is also an optical path splitting unit that splits the light from the second deformable mirror into a first optical path and a second optical path, a first sub-deformable mirror in the first optical path that includes a reflecting surface and a drive unit that correspond to the reflecting surface and the drive unit of the first deformable mirror, and a second sub-deformable mirror.

20 Claims, 16 Drawing Sheets

(56) References Cited

U.S. PATENT DOCUMENTS

| | | | |
|---|---|---|---|
| 2015/0042950 A1* | 2/2015 | Yamazaki | G02B 17/0642 |
| | | | 351/206 |
| 2015/0323872 A1* | 11/2015 | Van De Kerkhof | G03F 7/70575 |
| | | | 355/71 |
| 2016/0089023 A1* | 3/2016 | Takeno | A61B 3/14 |
| | | | 351/206 |
| 2020/0092005 A1* | 3/2020 | Hayakawa | H04B 10/071 |
| 2020/0209610 A1* | 7/2020 | Iwashimizu | G01J 9/00 |

* cited by examiner

ADAPTIVE OPTICAL APPARATUS, OPTICAL SYSTEM, AND OPTICAL WAVEFRONT COMPENSATION METHOD

CROSS-REFERENCES TO RELATED APPLICATIONS

The present application is a bypass continuation of PCT filing PCT/JP2018/018992, filed May 16, 2018, which claims priority to JP 2017-099907, filed May 19, 2017, both of which are incorporated herein by reference.

TECHNICAL FIELD

The present invention relates to an adaptive optical apparatus, an optical system, and an optical wavefront compensation method.

BACKGROUND ART

Conventionally, there has been known a satellite-mounted optical communication apparatus equipped with an optical wavefront curvature corrector for distortion of an optical wavefront caused by atmospheric fluctuations.

The optical wavefront curvature corrector is a unit for correcting a wavefront curvature of an optical signal, and displaces a mirror surface of an adaptive optical mirror (deformable mirror) for each minute section based on the correspondence relation between intensity of the optical signal and the wavefront curvature. In this manner, influence by atmospheric fluctuations can be suppressed. In addition, it is also possible to achieve a function of compensating for influence of atmospheric fluctuations using a sensor for wavefront monitoring.

SUMMARY OF INVENTION

An adaptive optical apparatus includes a first deformable mirror that includes a reflecting surface reflecting light having propagated through an atmosphere and a drive unit having a plurality of drive elements and changing an uneven shape of the reflecting surface, a second deformable mirror that includes a reflecting surface reflecting the light from the first deformable mirror and a drive unit having a plurality of drive elements and changing an uneven shape of the reflecting surface, an optical path splitting unit that splits the light from the second deformable mirror into a first optical path and a second optical path, a first sub-deformable mirror that is provided in the first optical path and includes a reflecting surface and a drive unit that correspond to the reflecting surface and the drive unit of the first deformable mirror, a second sub-deformable mirror that is provided in the second optical path and includes a reflecting surface and a drive unit that correspond to the reflecting surface and the drive unit of the second deformable mirror, a first detector that detects light intensity of the light from the first deformable mirror and the first sub-deformable mirror, a second detector that detects light intensity of the light from the second deformable mirror and the second sub-deformable mirror, and a controller that includes a first adaptive optical controller configured to execute a first optimization operation of controlling the drive unit of the first deformable mirror to update the uneven shape of the reflecting surface of the first deformable mirror based on a detected value of the first detector when the uneven shape of the reflecting surface of the first sub-deformable mirror is changed by controlling the drive unit of the first sub-deformable mirror, and a second adaptive optical controller configured to execute a second optimization operation of controlling the drive unit of the second deformable mirror to update the uneven shape of the reflecting surface of the second deformable mirror based on a detected value of the second detector when the uneven shape of the reflecting surface of the second sub-deformable mirror is changed by controlling the drive unit of the second sub-deformable mirror.

Further, an optical wavefront compensation method is an optical wavefront compensation method of an adaptive optical apparatus including a first deformable mirror that includes a reflecting surface reflecting light having propagated through an atmosphere and a drive unit having a plurality of drive elements and changing an uneven shape of the reflecting surface, a second deformable mirror that includes a reflecting surface reflecting the light from the first deformable mirror and a drive unit having a plurality of drive elements and changing an uneven shape of the reflecting surface, an optical path splitting unit that splits the light from the second deformable mirror into a first optical path and a second optical path, a first sub-deformable mirror that is provided in the first optical path and includes a reflecting surface and a drive unit that correspond to the reflecting surface and the drive unit of the first deformable mirror, a second sub-deformable mirror that is provided in the second optical path and includes a reflecting surface and a drive unit that correspond to the reflecting surface and the drive unit of the second deformable mirror, a first detector that detects light intensity of the light from the first deformable mirror and the first sub-deformable mirror, a second detector that detects light intensity of the light from the second deformable mirror and the second sub-deformable mirror, a first adaptive optical controller that controls the drive unit of each of the first deformable mirror and the first sub-deformable mirror, and a second adaptive optical controller that controls the drive unit of each of the second deformable mirror and the second sub-deformable mirror, the method having a first optimization operation step in which the first adaptive optical controller controls the drive unit of the first deformable mirror to update the uneven shape of the reflecting surface of the first deformable mirror based on a detected value of the first detector when the first adaptive optical controller changes the uneven shape of the reflecting surface of the first sub-deformable mirror by controlling the drive unit of the first sub-deformable mirror, and a second optimization operation step in which the second adaptive optical controller controls the drive unit of the second deformable mirror to update the uneven shape of the reflecting surface of the second deformable mirror based on a detected value of the second detector when the second adaptive optical controller changes the uneven shape of the reflecting surface of the second sub-deformable mirror by controlling the drive unit of the second sub-deformable mirror.

DESCRIPTION OF EMBODIMENTS

Hereinafter, embodiments of the present invention will be described with reference to the drawings. Note that the present invention is not limited by the present embodiment. Further, in the following, the same or corresponding elements will be denoted by the same reference signs throughout all the drawings, and the redundant description will be omitted.

Embodiment 1

Figure 1:
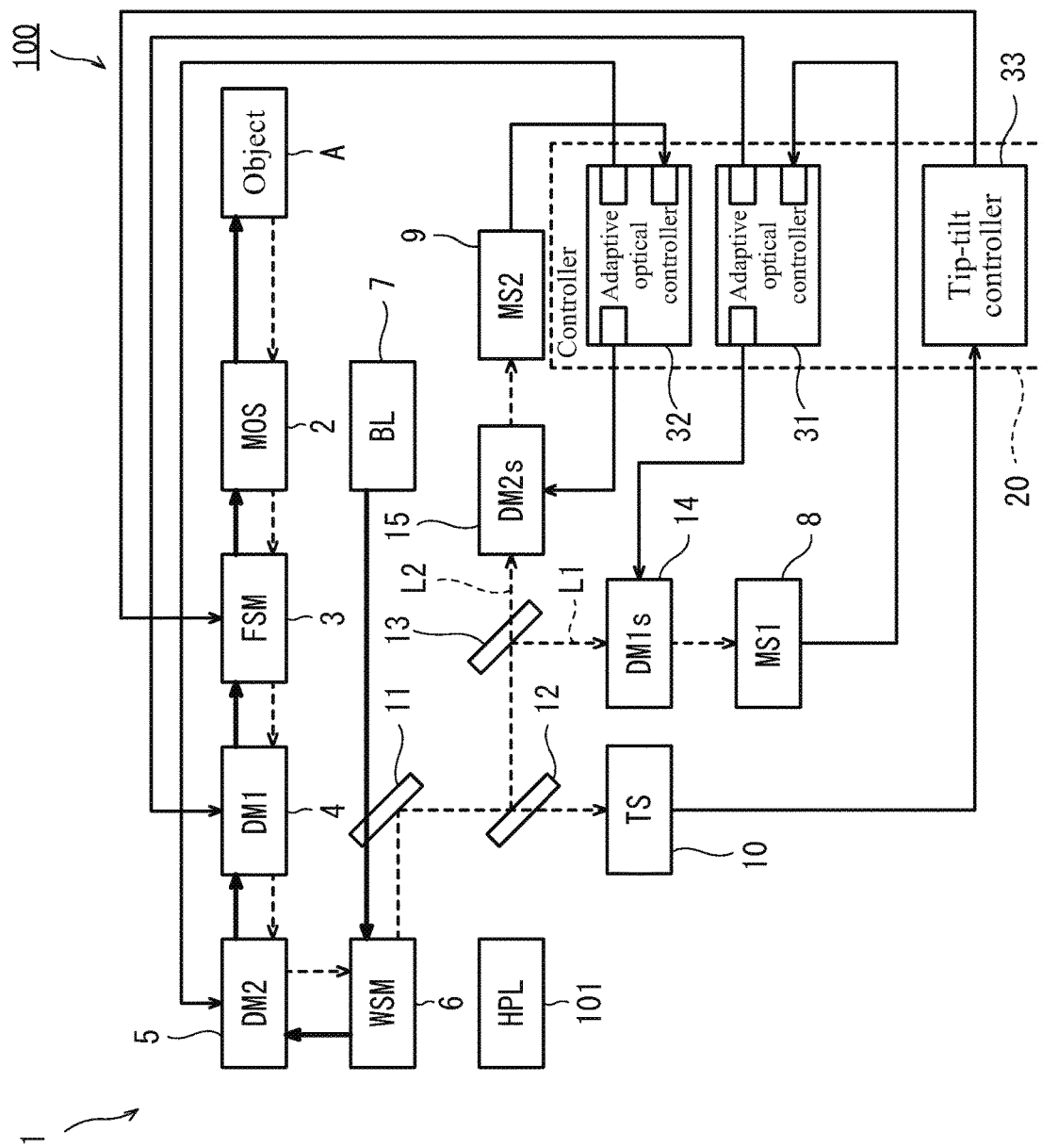
FIG. 1 is a block diagram illustrating a configuration example of an optical system including an adaptive optical apparatus according to Embodiment 1 and a configuration example of an optical path of a beacon laser when oscillating the beacon laser.

FIG. 1 is a block diagram illustrating a configuration example of an optical system 100 including an adaptive optical apparatus 1 according to Embodiment 1 and a configuration example of an optical path of a beacon laser when oscillating the beacon laser.

The optical system 100 includes laser oscillators (a beacon laser oscillator 7 and a high-power laser oscillator 101 described later), for example, and is used for an application to propagate laser light over a long distance (for example, several kilometers or more) in the atmosphere through a region including a vicinity of the ground, so as to irradiate an irradiated object A. In this application, when the ground is warmed by solar radiation, convection occurs therefrom, which becomes turbulence and causes a state that a non-uniformity of temperature distribution is generated in the atmosphere, that is, atmospheric fluctuation. The non-uniformity of temperature distribution corresponds to a non-uniformity of refractive index of light propagating through the space, distorts an optical wavefront, and causes deterioration of degree of concentration, fluctuations of a laser beam arrival position, and the like. The optical system 100 includes an adaptive optical apparatus 1 for compensating for deterioration of the degree of concentration, fluctuations of a laser beam arrival position, and the like. The irradiated object A is, for example, a flying object such as an airplane moving at high speed.

The adaptive optical apparatus 1 is an apparatus that compensates for deterioration of the degree of concentration, fluctuations of a laser beam arrival position, and the like due to atmospheric fluctuations by using, for example, an optimization method. As the optimization method, for example, a stochastic parallel gradient descent (SPGD) method can be used, but it is not limited to this, and for example, a genetic algorithm may be used instead. In the following, a configuration using the stochastic parallel gradient descent method will be described in detail.

The adaptive optical apparatus 1 includes a magnifying optical system 2, a fast steering mirror 3, a first deformable mirror 4, a second deformable mirror 5, a wavelength separating mirror 6, a beacon laser oscillator 7, a first metric sensor 8, a second metric sensor 9, a tilt sensor 10, a first beam splitter 11, a second beam splitter 12, a third beam splitter 13, a first sub-deformable mirror 14, a second sub-deformable mirror 15, and a controller 20.

The beacon laser oscillator (BL) 7 is a device that oscillates laser light, and oscillates laser light of output at a level at which reflected light from the irradiated object A can be detected by the first metric sensor 8, the second metric sensor 9, and the tilt sensor 10. A range of power of the beacon laser depends on a distance to a target and sensor sensitivity. When the distance to the target is one to several kilometers, an exemplary range of power of the beacon laser is several tens of watts to several hundreds of watts, although any desired power level is possible. Then, the laser light oscillated from the beacon laser oscillator 7 passes through the first beam splitter 11 and then passes through the wavelength separating mirror 6, the second deformable mirror 5, the first deformable mirror 4, the fast steering mirror 3, and the magnifying optical system 2 in this order and is emitted to an outside of the optical system 100, and reaches the irradiated object A as light having propagated through the atmosphere. This optical path constitutes an optical path on an outgoing path side in the optical system 100 (adaptive optical apparatus 1).

Further, laser light reflected at the irradiated object A enters the optical system 100 as light having propagated through the atmosphere, passes through the magnifying optical system 2, the fast steering mirror 3, the first deformable mirror 4, the second deformable mirror 5, the wavelength separating mirror 6, the first beam splitter 11, and the second beam splitter 12 in this order and reaches the tilt sensor 10. Then, part of the light that has reached the second beam splitter 12 at this time passes through the third beam splitter 13 and the first sub-deformable mirror 14 in this order and reaches the first metric sensor 8. Further, part of the light that has reached the third beam splitter 13 at this time passes through the second sub-deformable mirror 15 and reaches the second metric sensor 9. The respective optical paths from the irradiated object A to the first metric sensor 8, to the second metric sensor 9, and to the tilt sensor 10 constitute an optical path on a return path side of the optical system 100 (adaptive optical apparatus 1). Then, the optical path of a section between the irradiated object A and the wavelength separating mirror 6 (the second deformable mirror 5) within the optical path on the outgoing path side and the optical path of a same section of the optical path on the return path side are the same path. In addition, the orders of the elements on the optical paths of laser light are not limited to the above-described orders. For example, the order of the first deformable mirror 4 and the second deformable mirror 5 may be reversed.

The magnifying optical system (MOS) 2 has a function of magnifying a beam diameter of emitted laser light to a predetermined size, and includes, for example, an aspheric reflecting mirror. The magnifying optical system 2 is disposed, for example, at an end position of an inner section of the adaptive optical apparatus 1 in the optical path on the outgoing path side, that is, at a start position of an inner section of the adaptive optical apparatus 1 in the optical path on the return path side.

The fast steering mirror (FSM) 3 is configured to be capable of correcting a tip-tilt component of a wavefront, changes a reflection direction of incident light based on a drive signal received from a tip-tilt controller 33, and controls a direction of emitted light (an irradiation direction of laser light). Thus, laser light on the outgoing path emitted from the fast steering mirror 3 is adjusted in a direction of irradiating a predetermined position of the irradiated object A after being affected by atmospheric fluctuations.

Figure 3:
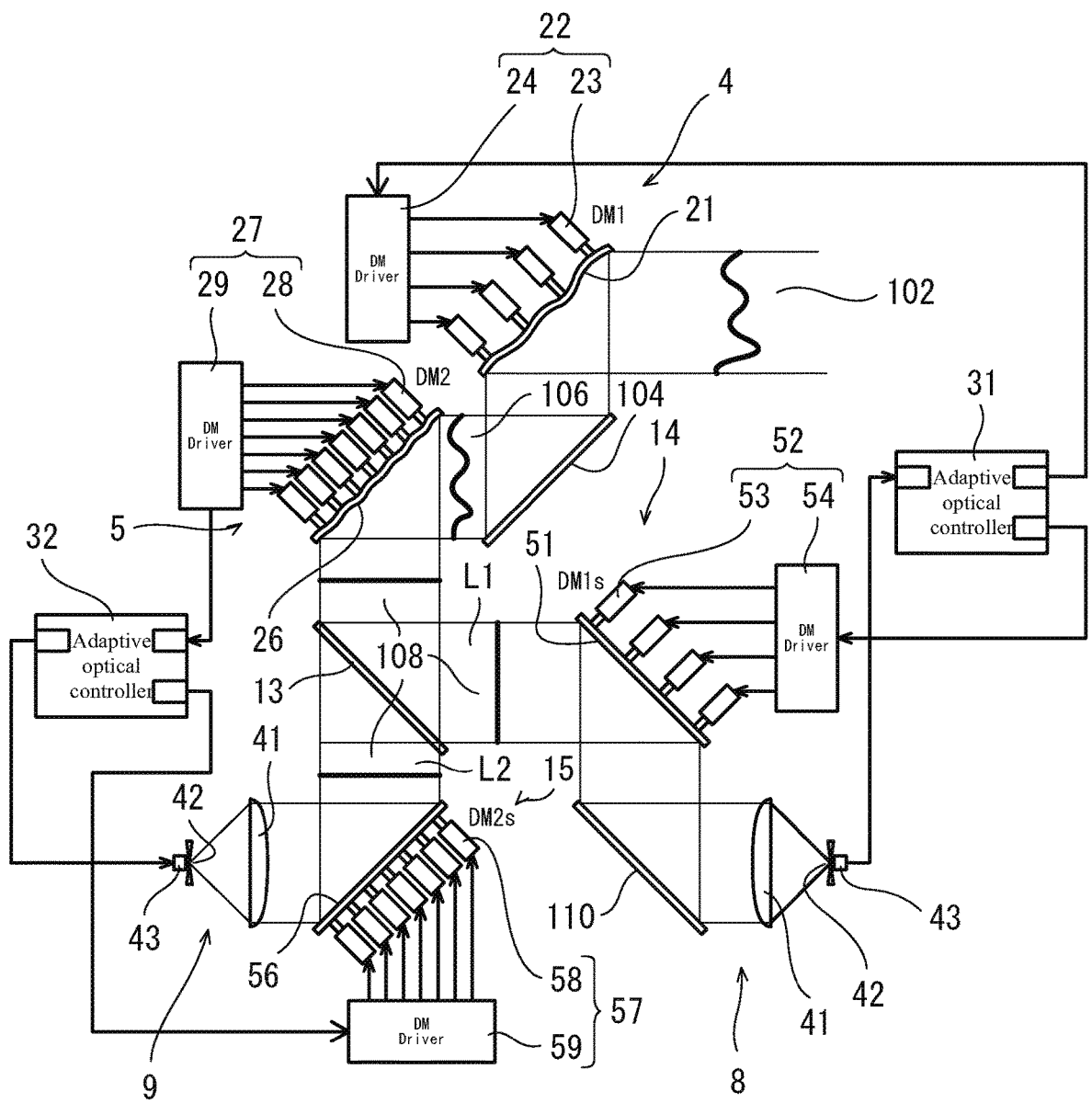
FIG. 3 is a view schematically illustrating a configuration example of the adaptive optical apparatus of the optical system of FIG. 1.

FIG. 3 is a view schematically illustrating a configuration example of the adaptive optical apparatus 1.

As illustrated in FIG. 3, the first deformable mirror (DM1) 4 includes a reflecting surface 21 that reflects laser light, and a drive unit 22 that changes an uneven shape of the reflecting surface 21. The first deformable mirror 4 is used to compensate for a wavefront error 102 of laser light by changing the uneven shape of the reflecting surface 21. Further, the first deformable mirror 4 is a deformable mirror having a large stroke width and a small number of drive elements while having low response performance, that is, having a long stroke and a low speed, and is configured to be applicable to compensation, for example, mainly for a wavefront error of relatively low order in a Zernike polynomial of laser light. The drive unit 22 includes a plurality of drive elements 23 and a first deformable mirror driver 24. Then, the first deformable mirror driver 24 operates each drive element 23 based on a drive signal received from a first adaptive optical controller 31 described later. The reflecting surface 21 of the first deformable mirror 4 reflects light having propagated through the atmosphere in the optical path on the return path side. Further, the reflecting surface 21 of the first deformable mirror 4 reflects laser light from the second deformable mirror 5 in the optical path on the outgoing path side.

The first sub-deformable mirror (DMIs) 14 includes a reflecting surface 51 that reflects laser light and a drive unit 52 that changes an uneven shape of the reflecting surface 51, and forms a pair with the first deformable mirror 4. The reflecting surface 51 is a reflecting surface corresponding to or related to the reflecting surface 21 of the first deformable mirror 4. The drive unit 52 is a drive unit corresponding to the drive unit 22 which the first deformable mirror 4 has. The drive unit 52 includes a plurality of drive elements 53 and a first sub-deformable mirror driver 54. Then, the first sub-deformable mirror driver 54 operates each drive element 53 based on a drive signal received from the first adaptive optical controller 31 described later. The first sub-deformable mirror 14 performs a r compensation operation of the first deformable mirror 4 and is preferably configured to be the same as the first deformable mirror 4. That is, each drive element 53 of the first sub-deformable mirror 14 is associated with one of the plurality of drive elements 23 of the first deformable mirror 4 in a one-to-one correspondence relation. Then, the position of each drive element 53 disposed on a back surface of the reflecting surface 51 of the first sub-deformable mirror 14 is arranged at the same position as the associated drive element 23 of the first deformable mirror 4 as each other, and the distribution of the drive elements 53 in the first sub-deformable mirror 14 and the distribution of the drive elements 23 in the first deformable mirror 4 are configured to be the same. The first sub-deformable mirror 14 is in a first optical path L1 described later in the optical path on the return path side, and reflects light that is reflected by the second deformable mirror 5 and coming via the third beam splitter 13.

The second deformable mirror (DM2) 5 receives light from the first deformable mirror 4 after reflecting off of mirror 104 and includes a reflecting surface 26 that reflects laser light, and a drive unit 27 that changes an uneven shape of the reflecting surface 26. The second deformable mirror 5 reflects light having a further reduced wavefront error 108. Similar to the first deformable mirror 4, the second deformable mirror 5 is used to compensate for a wavefront error 106, reduced in size as compared to the wavefront error 102, of laser light by changing the uneven shape of the reflecting surface 26. Further, the second deformable mirror 5 is a deformable mirror having a small stroke width and a large number of drive elements while having high response performance, that is, having a short stroke and a high speed, and is used to be applicable to compensation, for example, mainly for a wavefront error of relatively high order in the Zernike polynomial of laser light. The drive unit 27 includes a drive element 28 and a second deformable mirror driver 29. Then, each drive element 28 is operated based on a drive signal received from a second adaptive optical controller 32 described later. The reflecting surface 26 of the second deformable mirror 5 reflects laser light from the first deformable mirror 4 in the optical path on the return path side. Further, the reflecting surface 26 of the second deformable mirror 5 reflects laser light from the wavelength separating mirror 6, that is, laser light oscillated by the beacon laser oscillator 7 and the high-power laser oscillator 101 and superimposed on the same optical path in the optical path on the outgoing path side.

The second sub-deformable mirror (DM2s) 15 includes a reflecting surface 56 that reflects laser light and a drive unit 57 that changes an uneven shape of the reflecting surface 56, and forms a pair with the second deformable mirror 5. The reflecting surface 56 is a reflecting surface corresponding to the reflecting surface 26 of the second deformable mirror 5. The drive unit 57 is a drive unit corresponding to the drive unit 27 of the second deformable mirror 5. The drive unit 57 includes a plurality of drive elements 58 and a second sub-deformable mirror driver 59. Then, the second sub-deformable mirror driver 59 operates each drive element 58 based on a drive signal received from the second adaptive optical controller 32 described later. The second sub-deformable mirror 15 performs a compensation operation of the second deformable mirror 5 and is preferably configured to be the same as the second deformable mirror 5. That is, each drive element 58 of the second sub-deformable mirror 15 is associated with one of the plurality of drive elements 28 of the second deformable mirror 5 in a one-to-one correspondence relation. Then, the position of each drive element 58 disposed on a back surface of the reflecting surface 56 of the second sub-deformable mirror 15 is arranged at the same position as the associated drive element 28 of the second deformable mirror 5 as each other, and the distribution of the drive elements 58 in the second sub-deformable mirror 15 and the distribution of the drive element 28 in the second deformable mirror 5 are configured to be the same. The second sub-deformable mirror 15 is in a second optical path L2 different from the first optical path L1 described later in the optical path on the return path side, and reflects light that is reflected by the second deformable mirror 5 and coming via the third beam splitter 13.

The first deformable mirror 4, the second deformable mirror 5, the first sub-deformable mirror 14, and the second sub-deformable mirror 15 are, for example, stack array type deformable mirrors, and are each configured such that a plurality of drive elements (piezo actuators) (drive elements 23, drive elements 28, drive elements 53, or drive elements 58) are bonded to a back surface of a thin glass substrate constituting a mirror surface and having a front surface to which a high reflection coating of a dielectric multi-layer film or the like is applied. The plurality of drive elements are disposed in rows and columns on the back surface of the reflecting surface. The drive element expands and contracts in a normal direction (that is, an out-of-plane direction) of the reflecting surface according to a voltage applied. Then, the shape of the reflecting surface can be changed by changing a combination of expansion-contraction operations of the plurality of drive elements. Therefore, as the number of drive elements (number of channels) of the deformable mirror increases, the manufacturing cost increases but a complex uneven shape can be formed, which can be applied to compensation for a higher-order wavefront error in a Zernike polynomial. Thus, the number of drive elements is selected according to the range of the order of a wavefront error to be compensated. In the present embodiment, the numbers of drive elements of the first deformable mirror 4 and the first sub-deformable mirror 14 are, for example, nine, and the numbers of drive elements of the second deformable mirror 5 and the second sub-deformable mirror 15 are, for example, 37.

Further, a maximum displacement (stroke width) of the drive unit 27 of the second deformable mirror 5 and the drive unit 57 of the second sub-deformable mirror 15 is configured to be smaller than a maximum displacement (stroke width) of the drive unit 22 of the first deformable mirror 4 and the drive unit 52 of the first sub-deformable mirror 14. For example, the stroke width of the first deformable mirror 4 and the first sub-deformable mirror 14 is 2 μm, and the stroke width of the second deformable mirror 5 and the second sub-deformable mirror 15 is 80 nm. Then, as the stroke width becomes larger, an independent deformable mirror can compensate for a lower order wavefront error in the Zernike polynomial, but responsiveness decreases. In the deformable mirror, as the stroke width decreases, it becomes difficult to compensate for a lower order wavefront error in the Zernike polynomial, but meanwhile responsiveness improves. For example, a response frequency of a shape changing operation of the reflecting surface 21 of the first deformable mirror 4 and the reflecting surface 51 of the first sub-deformable mirror 14 having a large stroke width is 10 kHz, and a response frequency of a shape changing operation of the reflecting surface 26 of the second deformable mirror 5 and the reflecting surface 56 of the second sub-deformable mirror 15 having a small stroke width is 50 kHz Thus, the first deformable mirror 4 and the first sub-deformable mirror 14 are deformable mirrors having a long stroke and a low speed for low-order wavefront distortion correction, and the second deformable mirror 5 and the second sub-deformable mirror 15 are deformable mirrors having a short stroke and a high speed for high-order wavefront distortion correction.

In the present embodiment, the first deformable mirror 4, the second deformable mirror 5, the first sub-deformable mirror 14, and the second sub-deformable mirror 15 are stack array type deformable mirrors, but the present invention is not limited thereto. Instead of this, a bimorph type or MEMS type deformable mirror may be used.

The wavelength separating mirror (WSM) 6 selects a wavelength to be reflected and a wavelength to be transmitted for each wavelength of laser light, as illustrated in FIG. 1. That is, the wavelength of laser light oscillated by the beacon laser oscillator 7 (beacon laser) and the wavelength of laser light oscillated by the high-power laser oscillator 101 (main laser) are selected to be different wavelengths. Thus, for example, in a case of the wavelength separating mirror 6 that transmits the beacon laser and reflects the main laser, the beacon laser and the main laser can be coaxially superimposed on the outgoing path side. Further, on the return path side, by guiding the light transmitted through the wavelength separating mirror 6, it is possible to select return light of the main laser (the main laser reflected at the irradiated object A) and return light of the beacon laser (the beacon laser reflected at the irradiated object A). The transmission and reflection for each wavelength of the beacon laser and the main laser in the wavelength separating mirror 6 can be configured in reverse.

The first metric sensor (MS1) (first detector) 8 detects light intensity of laser light from the first deformable mirror 4 and the first sub-deformable mirror 14 in the optical path on the return path side, and outputs a detected value. The first metric sensor 8 is on the first optical path L1 split by the third beam splitter 13 in the optical path on the return path side. The detected value output from the first metric sensor 8 is input to the first adaptive optical controller 31.

The second metric sensor (MS2) (second detector) 9 detects light intensity of laser light from the second deformable mirror 5 and the second sub-deformable mirror 15 in the optical path on the return path side, and outputs the detected value. The second metric sensor 9 is on the second optical path L2 which is an optical path different from the first optical path L1 split by the third beam splitter 13 in the optical path on the return path side. The detected value output from the second metric sensor 9 is input to the second adaptive optical controller 32.

Each of the first metric sensor 8 and the second metric sensor 9 includes, for example, a condensing lens 41 and a sensor main body 43 that detects light intensity of laser light having passed through a pinhole 42 having an appropriate diameter and disposed at a light collection point of the condensing lens 41. The sensor main body 43 is a high-speed light detection element such as a photodiode, and is configured such that a detected value is maximized in a desired incident wavefront state. Thus, the metric sensor is configured to detect the degree of collection performance of laser light. Light detected by the first metric sensor 8 and the second metric sensor 9 is not limited to light oscillated from the beacon laser oscillator 7.

The tilt sensor (TS) 10 detects an amount of deviation from the central axis of a light collecting position corresponding to an inclination component (tip-tilt component) of an optical wavefront when laser light reflected by the irradiated object A is affected by atmospheric fluctuations and enters the optical system 100, and outputs a detected value. The detected value output from the tilt sensor 10 is input to the tip-tilt controller 33.

The controller 20 includes, for example, an arithmetic unit such as a microcontroller, a CPU, an ASIC, or a programmable logic device (PLD) such as a FPGA, each of which is circuitry. The controller 20 may include an independent controller that performs centralized control, or may be constituted of a plurality of controllers that perform distributed control in cooperation with each other. The controller 20 also includes a storage unit or memory that stores various programs and data. The controller 20 includes a first adaptive optical controller 31, a second adaptive optical controller 32, and a tip-tilt controller 33. The first adaptive optical controller 31, the second adaptive optical controller 32, and the tip-tilt controller 33 may each be configured as a function block implemented by the controller 20 executing a predetermined control program stored in the storage unit.

The first adaptive optical controller 31 controls the drive unit 22 of the first deformable mirror 4 and the drive unit 52 of the first sub-deformable mirror 14 based on a detected value received from the first metric sensor 8. That is, the first adaptive optical controller 31 controls operation of the plurality of drive elements 23 via the first deformable mirror driver 24, so as to change the uneven shape of the reflecting surface 21. Further, the first adaptive optical controller 31 controls operation of the plurality of drive elements 53 via the first sub-deformable mirror driver 54, so as to change the uneven shape of the reflecting surface 51 (see FIG. 3). The first adaptive optical controller 31 is configured to be able to execute a first optimization operation (details will be described later). The first adaptive optical controller 31 outputs a control signal to the first deformable mirror 4 and a control signal to the first sub-deformable mirror 14.

The second adaptive optical controller 32 controls the drive unit 27 of the second deformable mirror 5 and the drive unit 57 of the second sub-deformable mirror 15 based on a detected value received from the second metric sensor 9. That is, the second adaptive optical controller 32 controls operation of the plurality of drive elements 28 via the second deformable mirror driver 29, so as to change the uneven shape of the reflecting surface 26. Further, the second adaptive optical controller 32 controls operation of the plurality of drive elements 58 via the second sub-deformable mirror driver 59, so as to change the uneven shape of the reflecting surface 56 (see FIG. 3). The second adaptive optical controller 32 is configured to be able to execute a second optimization operation (details will be described later). The second adaptive optical controller 32 outputs a control signal to the second deformable mirror 5 and a control signal to the second sub-deformable mirror 15.

The tip-tilt controller 33 calculates a tilt component (tip-tilt component) of an optical wavefront when laser light in the return path is affected by atmospheric fluctuations and enters the optical system 100 based on a detected value received from the tilt sensor 10. Then, a control signal to the fast steering mirror 3 for controlling operation of the fast steering mirror 3 is output so that the tilt component of the optical wavefront in the tilt sensor 10 becomes zero, that is, the outgoing path side has the same tilt component as the return path side.

The first beam splitter 11, the second beam splitter 12, and the third beam splitter 13 partially reflect incident light and transmit remaining light thereof so as to split laser light into different optical paths, or merge (superimpose) optical paths of a plurality of laser lights of different optical paths into one optical path.

The first beam splitter 11 reflects a part of laser light incident from the wavelength separating mirror 6 toward the second beam splitter 12 in the optical path on the return path side. In addition, the first beam splitter 11 places (superimposes) laser light emitted from the beacon laser oscillator 7 in the optical path on the outgoing path side onto the same optical path as the optical path on the return path side through which laser light from the wavelength separating mirror 6 is incident on the first beam splitter 11.

The second beam splitter 12 partially reflects laser light incident from the first beam splitter 11 in the optical path on the return path side, and emits the reflected laser light toward the third beam splitter 13. Further, the second beam splitter 12 transmits remaining laser light, and the transmitted laser light is incident on the tilt sensor 10.

The third beam splitter (optical path splitting unit) 13 splits the light from the second deformable mirror 5 into the first optical path L1 and the second optical path L2 in the optical path on the return path side. That is, the third beam splitter 13 partially reflects laser light incident from the second beam splitter 12 in the optical path on the return path side, and emits the reflected laser light toward the first sub-deformable mirror 14. Further, the third beam splitter 13 transmits remaining laser light and emits the transmitted laser light toward the second sub-deformable mirror 15. Consequently, it is possible to prevent a change in the shape of the reflecting surface 51 of the first sub-deformable mirror 14 from affecting the detected value of the second metric sensor 9, and to prevent a change in the shape of the reflecting surface 56 of the second sub-deformable mirror 15 from affecting the detected value of the first metric sensor 8.

Figure 2:
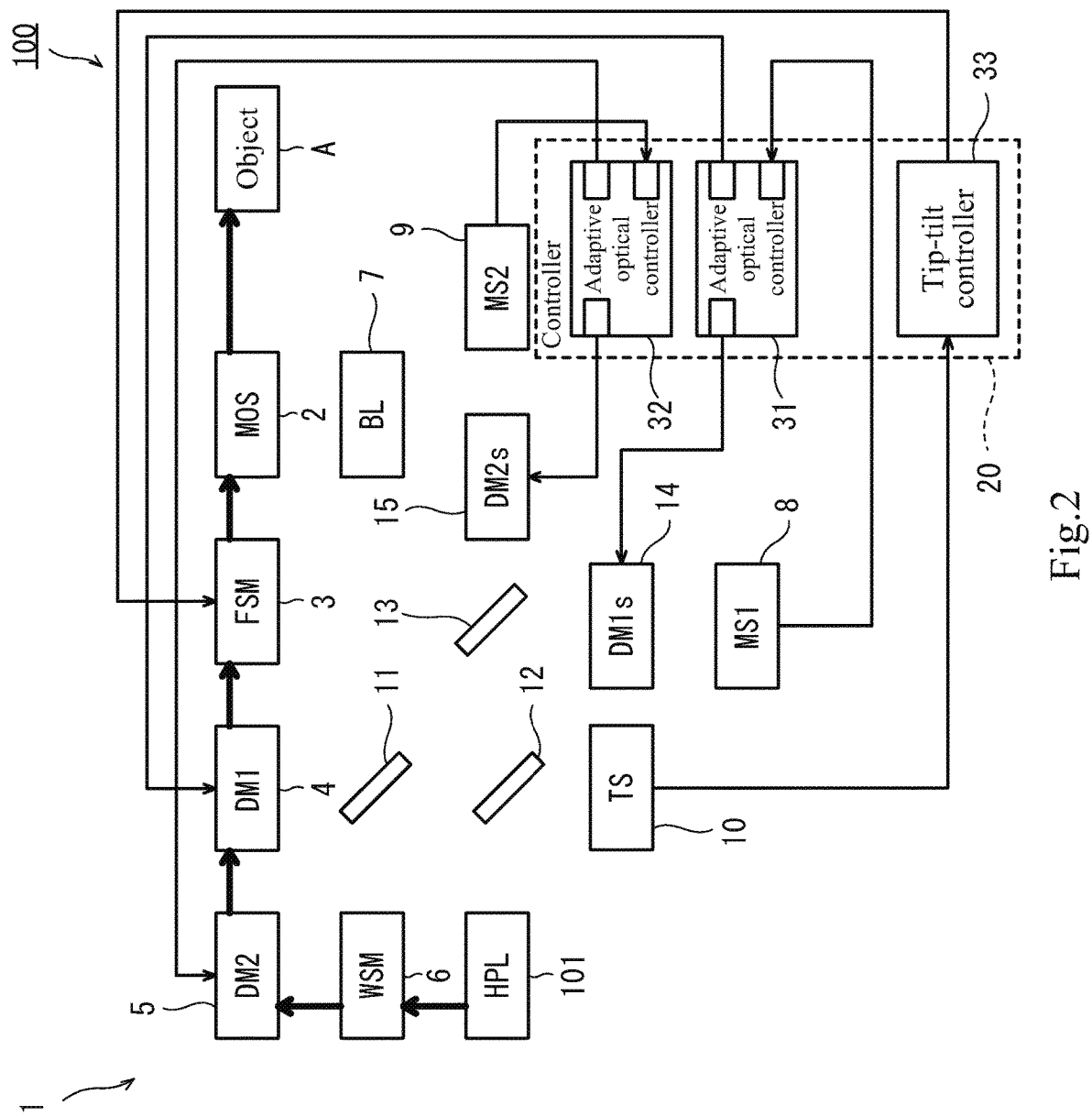
FIG. 2 is a block diagram illustrating a configuration example of the optical system of FIG. 1 and a configuration example of an optical path of a main laser when oscillating the main laser.

FIG. 2 is a block diagram illustrating a configuration example of the optical system 100 and a configuration example of an optical path of the main laser when oscillating the main laser.

As illustrated in FIG. 2, the optical system 100 includes a high-power laser oscillator 101. The high-power laser oscillator 101 is a device that oscillates laser light, and oscillates high-power laser light, that is, a main laser. An exemplary high power laser can have a power from 1 kW to 1 MW, although any desired power can be used. The wavelength of the main laser is configured to be different from the wavelength of the beacon laser. Then, the laser light oscillated from the high-power laser oscillator 101 passes through the wavelength separating mirror 6, the second deformable mirror 5, the first deformable mirror 4, the fast steering mirror 3, and the magnifying optical system 2 in this order, and is emitted to the outside of the optical system 100, propagates through the atmosphere, and reaches the irradiated object A. The optical path of a section between the wavelength separating mirror 6 (the second deformable mirror 5) and the irradiated object A is the same path as an optical path of the beacon laser in the same section.

Operation Example

Next, an operation example of the optical system 100 will be described.

Operation Example of First Optimization Operation

Figure 4:
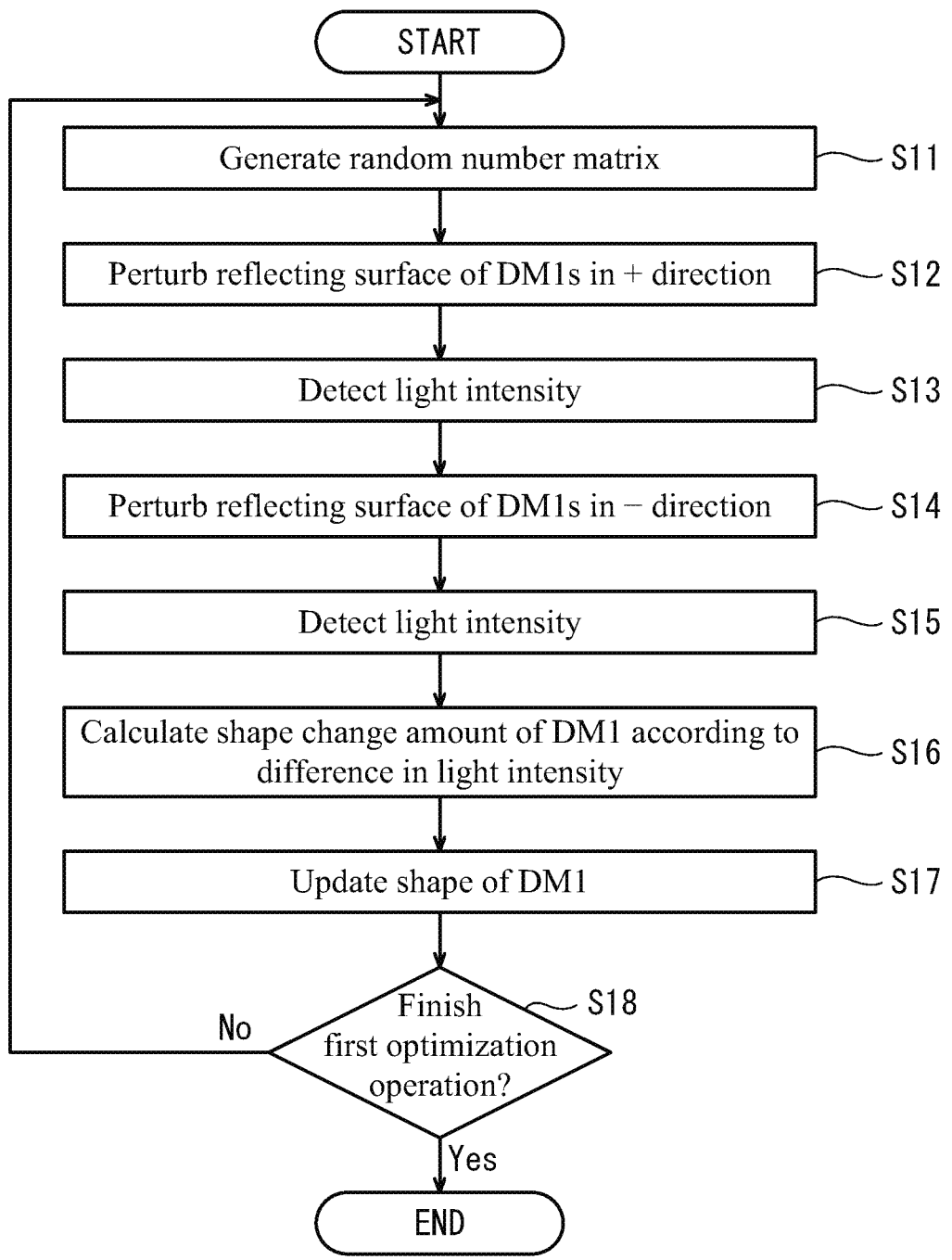
FIG. 4 is a flowchart illustrating an operation example of the optical system of FIG. 1.

FIG. 4 is a flowchart illustrating an operation example of a first optimization operation of the optical system 100. FIG.

6 is a block diagram illustrating an operation example of the first optimization operation of the optical system 100.

First, when the beacon laser oscillator 7 oscillates laser light, the oscillated laser light passes through the first beam splitter 11, and passes through the wavelength separating mirror 6, the second deformable mirror 5, the first deformable mirror 4, the fast steering mirror 3, and the magnifying optical system 2 in this order, and is emitted to the outside of the optical system 100, propagates through the atmosphere, and reaches the irradiated object A. Then, laser light reflected by the irradiated object A enters the optical system 100 as light having propagated through the atmosphere, and passes through the magnifying optical system 2, the fast steering mirror 3, the first deformable mirror 4, the second deformable mirror 5, the wavelength separating mirror 6, the first beam splitter 11, the second beam splitter 12, the third beam splitter 13, and the first sub-deformable mirror 14 in this order and reaches the first metric sensor 8, and the first metric sensor 8 detects light intensity of the reflected light affected by atmospheric fluctuations.

Then, the first adaptive optical controller 31 repeatedly executes the following first optimization operation. As a result, an optimization process thereof converges within a period T (see FIG. 7) of an atmospheric fluctuation state change determined according to atmospheric fluctuation conditions. The number of repetitions in a convergence period T1 (see FIG. 7) is assumed to be 15, for example. The first optimization operation is an operation of controlling the drive unit 22 of the first deformable mirror 4 to update the uneven shape of the reflecting surface of the first deformable mirror 4 based on a detected value of the first metric sensor 8 when the uneven shape of the reflecting surface 51 of the first sub-deformable mirror 14 is changed by controlling the drive unit 52 of the first sub-deformable mirror 14. Light from the reflecting surface 51 reflects off of a mirror 110 before being received by the first metric sensor 8.

Figure 6:
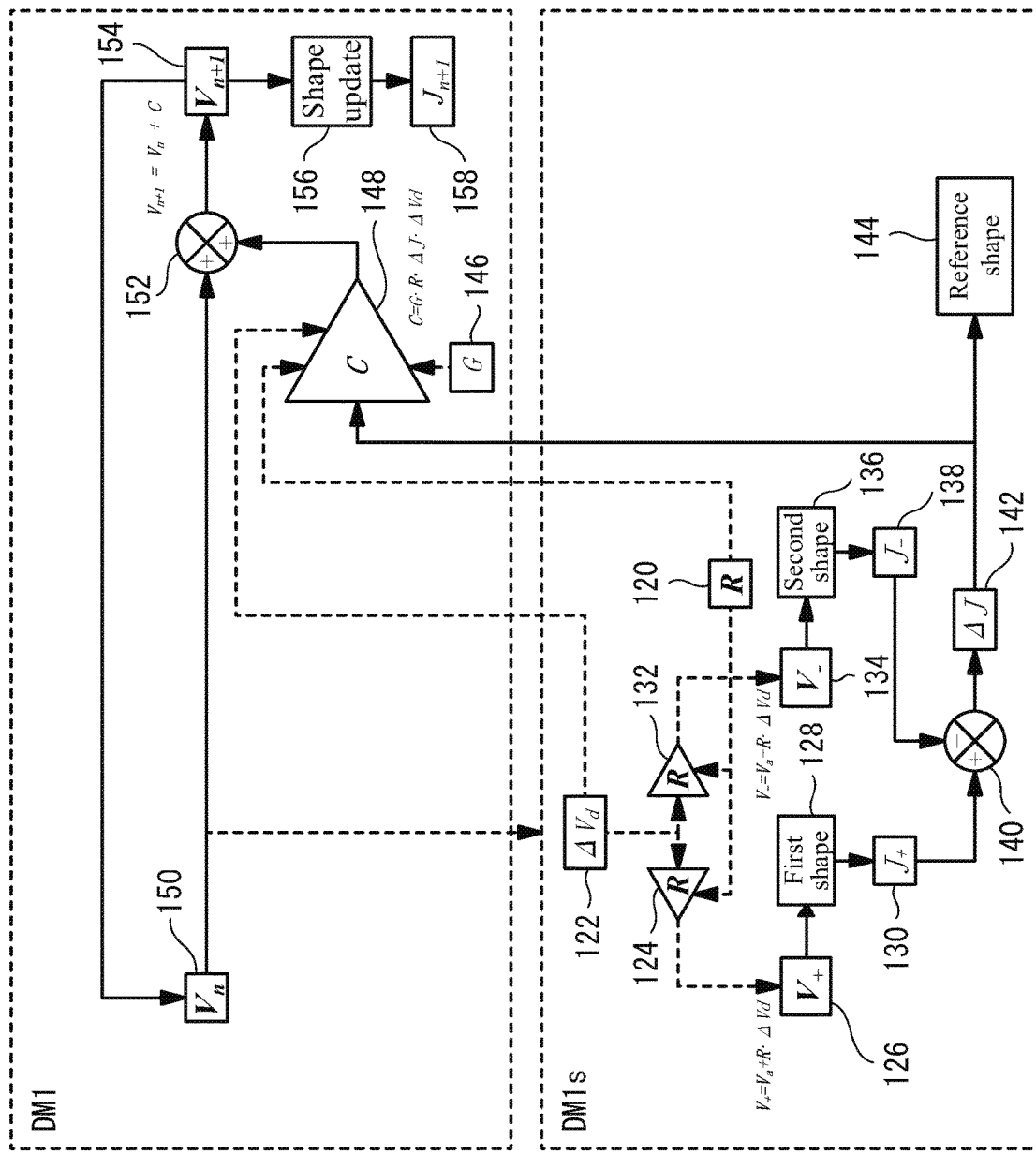
FIG. 6 is a block diagram illustrating an operation example of a first optimization operation of the optical system of FIG. 1.

Specifically, in the first optimization operation, the first adaptive optical controller 31 first generates a random number matrix R 120 having the same number of components as the number of channels of the first sub-deformable mirror 14 (step S11). Details of this process are shown in FIG. 6.

Next, the first adaptive optical controller 31 calculates V$_+$ 126 by adding V$_a$ to a product of R 120 multiplied by ΔV$_d$ 122 in the multiplier 124 according to equation (1).

$$V_+ = V_a + R \cdot \Delta V_d \tag{1}$$

Here,

V$_+$ 126 is an applied voltage matrix to the drive elements of the first sub-deformable mirror at a time of perturbation in a positive direction at a time of the first optimization operation, V$_a$ is an applied voltage matrix to the first sub-deformable mirror in a first reference shape, and ΔV$_d$ 122 is a predetermined voltage corresponding to a predetermined perturbation amplitude.

Then, the first adaptive optical controller 31 applies a voltage related to an element of V$_+$ corresponding to each drive element 53 to each drive element 53 of the first sub-deformable mirror 14, so as to change the uneven shape of the reflecting surface 51 of the first sub-deformable mirror 14 from the first reference shape to the first shape 128 to perturb the reflecting surface 51 of the first sub-deformable mirror 14 in the positive direction (to give a positive dither) (step S12). As indicated in the above equation (1), the first shape is the shape of the reflecting surface 51 of the first sub-deformable mirror 14 defined by adding to the first reference shape a first shape change amount randomly selected every time the first optimization operation is executed on the plurality of drive elements 53 of the first sub-deformable mirror 14. The first shape change amount is defined by an operating amount randomly selected for each of the plurality of drive elements 53 of the first sub-deformable mirror 14. By randomly selecting the shape change amount in this manner, it is possible to effectively prevent falling into a local optimum in the first optimization operation. Note that in the present embodiment, R is a matrix in which one of 1 or −1 is randomly selected, and ΔV$_d$ is a predetermined value.

Next, the first adaptive optical controller 31 obtains light intensity J$_+$ 130 of the reflected light having passed through the first deformable mirror 4, the second deformable mirror 5, and the first sub-deformable mirror 14 in which the reflecting surface 51 is perturbed in the + (plus) direction in this order, and reached the first metric sensor 8 (step S13).

Next, the first adaptive optical controller 31 calculates V$_-$ 134 by subtracting a product of R 120 multiplied by ΔV$_d$ 122 calculated in the multiplier 132 from V$_a$ in accordance with equation (2).

$$V_- = V_a - R \cdot \Delta V_d \tag{2}$$

Here,

V$_-$ 134 is an applied voltage matrix to the drive elements of the first sub-deformable mirror at a time of perturbation in a negative direction at a time of the first optimization operation.

Then, the first adaptive optical controller 31 applies a voltage related to an element of V$_-$ corresponding to each drive element 53 to each drive element 53 of the first sub-deformable mirror 14, so as to change it to a second shape 136 to perturb the reflecting surface 51 of the first sub-deformable mirror 14 in the negative direction (to give a negative dither) (step S14). As indicated in the above equation (2), the second shape is a shape in which the uneven shape of the reflecting surface 51 of the first sub-deformable mirror 14 is symmetrical to the first shape with respect to the first reference shape.

Next, the first adaptive optical controller 31 obtains light intensity J$_-$ 138 of the reflected light having passed through the first deformable mirror 4, the second deformable mirror 5, and the first sub-deformable mirror 14 in which the reflecting surface 51 is perturbed in the − (negative) direction in this order, and reached the first metric sensor 8 (step S15).

Next, the first adaptive optical controller 31 calculates a voltage corresponding to a shape change amount V$_c$ by multiplying in the multiplier 148 G 146, R 120, ΔJ 142, and ΔV$_d$ 122 according to equations (3) and (4) (step S16).

$$V_c = G \cdot R \cdot \Delta J \cdot \Delta V_d \tag{3}$$

$$\Delta J = J_+ - J_- \tag{4},$$

where ΔJ 142 is obtained by subtracting J$_-$ 138 from J$_+$ 130 in the subtractor 140.

Here,

G is a gain in this optimization control and is a predetermined value, and ΔJ corresponds to reference shape 144.

V$_{n+1}$ 154 is calculated by adding V$_c$ to V$_n$ 150. The first adaptive optical controller 31 applies a voltage related to an element of V$_{n+1}$ of equation (5) corresponding to each drive element 23 to each drive element 23 of the first deformable mirror 4, thereby updating the shape of the reflecting surface 21 of the first deformable mirror 4 to obtain an updated shape 156 for J$_{n+1}$ 158 (step S17).

$$V_{n+1}=V_n+V_c \quad (5)$$

Here, $V_n$ is an applied voltage matrix to the first deformable mirror before an n-th (n is an integer of 1 or more) first optimization operation.

As indicated in the equations (1) to (5), in the optimization method using the stochastic parallel gradient descent method, the detected value of the first metric sensor 8 constitutes an evaluation function in the optimization method. The above-described step S11 to step S17 constitute the first optimization operation.

As described above, in the first optimization operation, the first adaptive optical controller 31 changes the uneven shape of the reflecting surface 21 of the first deformable mirror 4 toward one shape out of the first shape and the second shape of the reflecting surface 51 of the first su-deformable mirror 14 to update the uneven shape of the reflecting surface 21 of the first deformable mirror 4, the one shape having stronger light intensity detected by the first metric sensor 8. That is, when the value of the light intensity $J_+$ is larger than the light intensity $J_-$, the value of $\Delta J$ becomes positive, and the value of the voltage corresponding to the shape change amount $V_c$ denotes a value that causes the uneven shape of the reflecting surface 21 of the first deformable mirror 4 to be changed to the first shape side from the shape when starting the n-th first optimization operation. On the other hand, when the value of the light intensity $J_+$ is smaller than the light intensity $J_-$, the value of $\Delta J$ becomes negative, and the value of the voltage corresponding to the shape change amount $V_c$ denotes a voltage value that causes the uneven shape of the reflecting surface 21 of the first deformable mirror 4 to be changed to the second shape side from the shape when starting the n-th first optimization operation. That is, the first adaptive optical controller 31 calculates the voltage corresponding to the shape change amount $V_c$ so that the uneven shape of the reflecting surface 21 of the first deformable mirror 4 is changed in a direction in which the light intensity increases, and then the uneven shape of the reflecting surface 21 of the first deformable mirror 4 is updated based on this.

Further, as indicated in the above equation (3), the value of the shape change amount $V_c$ becomes smaller as the uneven shape of the reflecting surface 21 of the first deformable mirror 4 approaches a convergent shape and the value of $\Delta J$ becomes smaller, and thus the uneven shape of the reflecting surface 21 of the first deformable mirror 4 can be appropriately converged.

Next, the first adaptive optical controller 31 executes the operation related to step S1 again (step S18) until it is determined that the first optimization operation is ended (until determined as Yes in step S18). Note that the operation related to step S11 may be executed again without performing the determination in step S18. When the degree of concentration is degraded due to the influence of atmospheric fluctuations and the beam diameter at the light collection point expands, the light intensity passing through a minute aperture such as a pinhole at the light collection point becomes weak. The first adaptive optical controller 31 repeatedly updates the uneven shape of the reflecting surface 21 of the first deformable mirror 4 so that light intensity of a central portion at a light collection point of this laser light approaches a maximum value using the optimization method.

The first adaptive optical controller 31 may execute an initializing operation of the first sub-deformable mirror 14 at the timing of executing step S16. The initializing operation of the first sub-deformable mirror 14 is an operation to change the reflecting surface 51 of the first sub-deformable mirror 14 into the first reference shape, and to change the uneven shape of the reflecting surface 51 of the first sub-deformable mirror 14 from the second shape to the first reference shape by applying a voltage related to the element of $V_a$ corresponding to each drive element 53 of the first sub-deformable mirror 14. Thus, it is possible to prevent a change in shape of the first sub-deformable mirror 14 from affecting detected values of the first metric sensor 8 before and after the first optimization operation.

Operation Example of Second Optimization Operation

Figure 5:
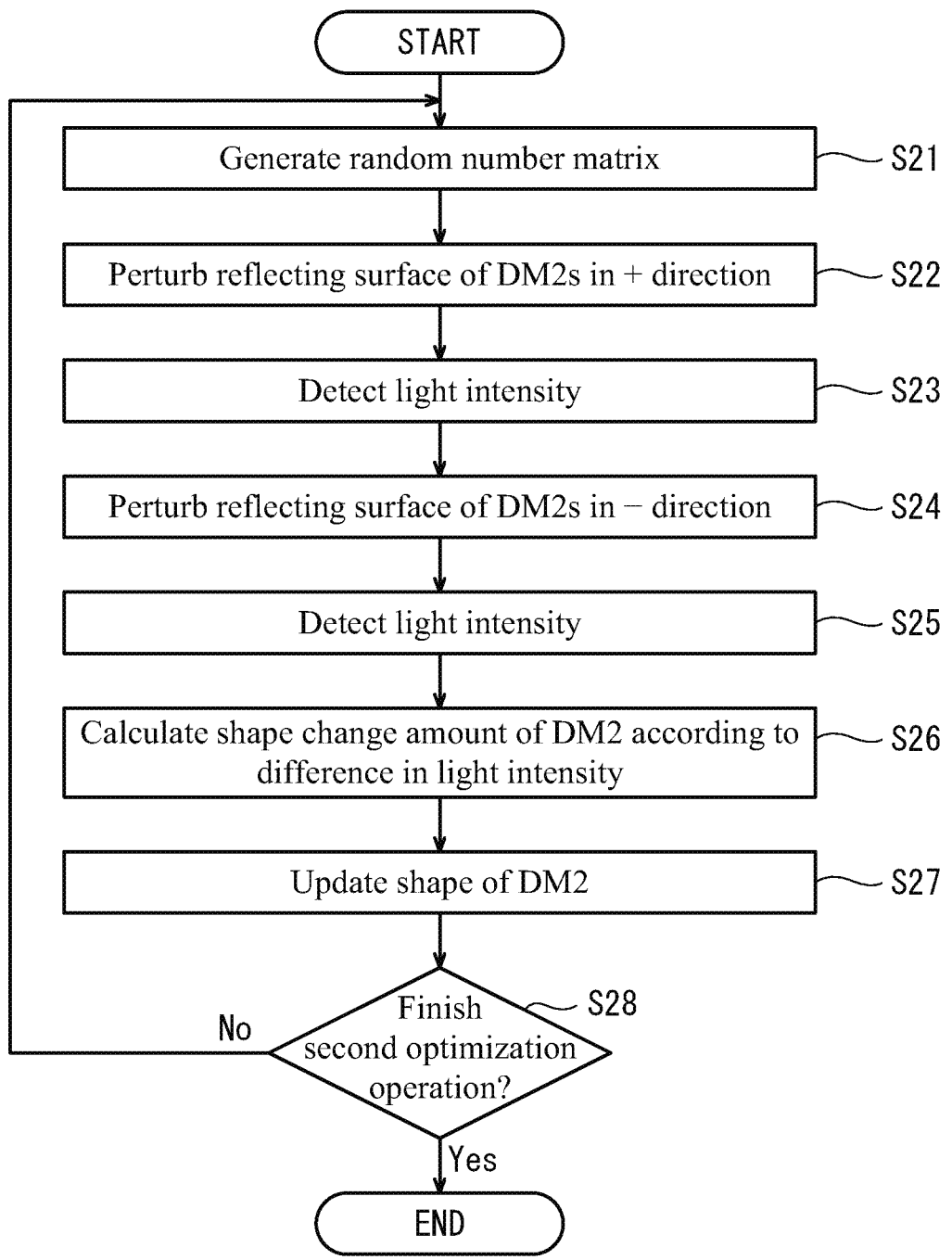
FIG. 5 is a flowchart illustrating an operation example of the optical system of FIG. 1.

FIG. 5 is a flowchart illustrating an operation example of a second optimization operation of the optical system 100.

Further, laser light reflected by the irradiated object A enters the optical system 100 as light having propagated through the atmosphere, and passes through the magnifying optical system 2, the fast steering mirror 3, the first deformable mirror 4, the second deformable mirror 5, the wavelength separating mirror 6, the first beam splitter 11, the second beam splitter 12, the third beam splitter 13, and the second sub-deformable mirror 15 in this order and reaches the second metric sensor 9, and the second metric sensor 9 detects light intensity of the reflected light affected by atmospheric fluctuations.

Then, in parallel with the first adaptive optical controller 31 repeatedly executing the first optimization operation, the second adaptive optical controller 32 repeatedly executes the second optimization operation. As a result, a optimization process thereof converges within a period T (see FIG. 7) of an atmospheric fluctuation state change determined according to atmospheric fluctuation conditions. The number of repetitions in the convergence period T1 (see FIG. 7) is assumed to be 75, for example. The second optimization operation is configured to converge at the same timing as the first optimization operation. The second optimization operation is an operation of controlling the drive unit 27 of the second deformable mirror 5 to update the uneven shape of the reflecting surface 26 of the second deformable mirror 5 based on a detected value of the second metric sensor 9 when the uneven shape of the reflecting surface 56 of the second sub-deformable mirror 15 is changed by controlling the drive unit 57 of the second sub-deformable mirror 15.

Specifically, in the second optimization operation, the second adaptive optical controller 32 first generates a random number matrix R having the same number of components as the number of channels of the second sub-deformable mirror 15 (step S21).

Next, the second adaptive optical controller 32 calculates $V_+$. The calculation of $V_+$ is similar to that of the above equation (1), and thus the detailed description thereof will be omitted.

Then, the second adaptive optical controller 32 applies a voltage related to an element of $V_+$ corresponding to each drive element 58 of the second sub-deformable mirror 15, so as to change the uneven shape of the reflecting surface 56 of the second sub-deformable mirror 15 from a predetermined second reference shape to a third shape to perturb the reflecting surface 56 of the second sub-deformable mirror 15 in the positive direction (to give a positive dither) (step S22). Similar to the first shape in the first optimization operation, the third shape is the shape of the reflecting surface 56 of the second sub-deformable mirror 15 defined by adding to the reference shape a second shape change amount randomly selected every time the second optimization operation is executed on the plurality of drive elements 58 of the second sub-deformable mirror 15. The second shape change amount is defined by an operating amount randomly selected for each of the plurality of drive elements 58 of the second sub-deformable mirror 15.

Next, the second adaptive optical controller 32 obtains light intensity $J_+$ of the reflected light having passed through the first deformable mirror 4, the second deformable mirror 5, and the second sub-deformable mirror 15 in which the reflecting surface 56 is perturbed in the + (plus) direction in this order, and reached the second metric sensor 9 (step S23).

Next, the second adaptive optical controller 32 calculates $V_-$. The calculation of $V_-$ is similar to that of the above equation (2), and thus the detailed description thereof will be omitted.

Then, the second adaptive optical controller 32 applies a voltage related to an element of $V_-$ corresponding to each drive element 58 of the second sub-deformable mirror 15, so as to change it to a fourth shape to perturb the reflecting surface 56 of the second sub-deformable mirror 15 in the negative direction (to give a negative dither) (step S24). Similar to the relationship between the first shape and the second shape, the fourth shape is a shape in which the uneven shape of the reflecting surface 56 of the second sub-deformable mirror 15 is symmetrical to the third shape with respect to the second reference shape.

Next, the second adaptive optical controller 32 obtains light intensity $J_-$ of the reflected light having passed through the first deformable mirror 4, the second deformable mirror 5, and the second sub-deformable mirror 15 in which the reflecting surface 56 is perturbed in the − (negative) direction in this order, and reached the second metric sensor 9 (step S25).

Next, the second adaptive optical controller 32 calculates the shape change amount $V_c$ (step S26). The calculation of $V_-$ is similar to that of the above equations (3) and (4), and thus the detailed description thereof will be omitted.

Next, the second adaptive optical controller 32 applies a voltage related to an element of $V_{n+1}$ to each drive element 28 of the second deformable mirror 5, thereby updating the shape of the reflecting surface 26 of the second deformable mirror 5 (step S27). The calculation of $V_{n+1}$ is similar to that of the above equation (5), and thus the detailed description thereof will be omitted.

Similar to the first optimization operation, in the second optimization operation, the detected value of the second metric sensor 9 constitutes an evaluation function in the optimization method. Steps S21 to S27 constitute the second optimization operation.

As described above, in the second optimization operation, the second adaptive optical controller 32 changes the uneven shape of the reflecting surface 26 of the second deformable mirror 5 toward one shape out of the third shape and the fourth shape of the reflecting surface 56 of the second sub-deformable mirror 15 to update the uneven shape of the reflecting surface 26 of the second deformable mirror 5, the one shape having stronger light intensity detected by the second metric sensor 9.

Next, the second adaptive optical controller 32 executes the operation related to step S11 again (step S28) until it is determined that the second optimization operation is ended (until determined as Yes in step S28). Note that the operation related to step S11 may be executed again without performing the determination in step S28.

The second adaptive optical controller 32 may execute the initializing operation of the second sub-deformable mirror 15 at the timing of executing step S26. The initializing operation of the second sub-deformable mirror 15 is an operation to change the reflecting surface 56 of the second sub-deformable mirror 15 into the second reference shape, and to change the uneven shape of the reflecting surface 56 of the second sub-deformable mirror 15 from the fourth shape to the second reference shape by applying a voltage related to the element of $V_a$ corresponding to each drive element 58 of the second sub-deformable mirror 15. Thus, it is possible to prevent a change in shape of the second sub-deformable mirror 15 from affecting detected values of the second metric sensor 9 before and after the second optimization operation.

Then, since the optical path is split into the first optical path L1 and the second optical path L2 by the third beam splitter 13, it is possible to prevent the change in shape (perturbation) of the first sub-deformable mirror 14 in above-described step S12 and step S14 of the first optimization operation from affecting the detected value of the second metric sensor 9 in the second optimization operation, that is, the evaluation function in the optimization, and interfering with the second optimization operation. Similarly, it is possible to prevent the change in shape (perturbation) of the second sub-deformable mirror 15 in above-described step S22 and step S24 of the second optimization operation from affecting the detected value of the first metric sensor 8 in the first optimization operation, that is, the evaluation function in the optimization, and interfering with the second optimization operation.

Figure 7:
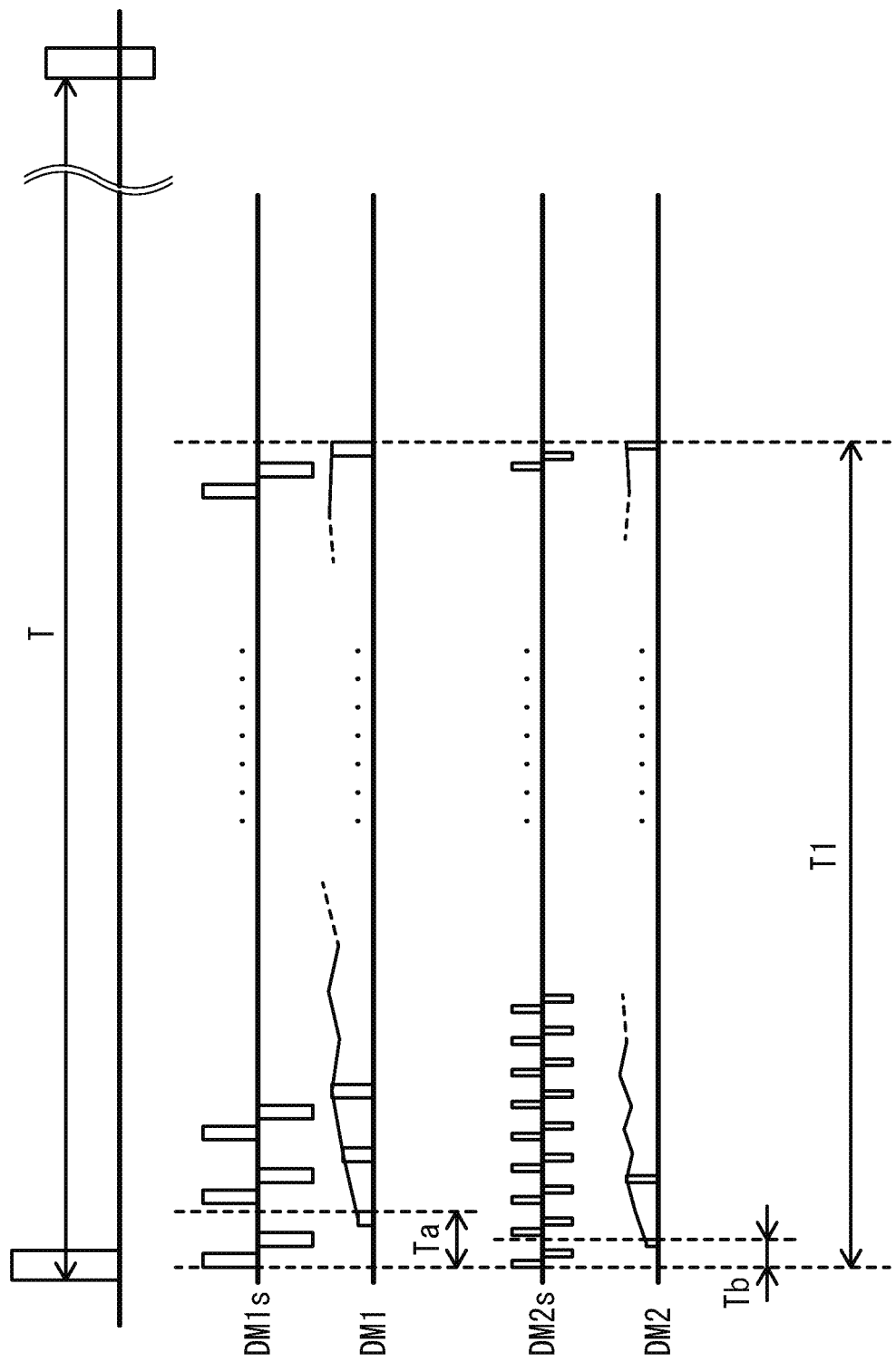
FIG. 7 is a time chart illustrating an operation example of the optimization operation of the optical system of FIG. 1.

FIG. 7 is a time chart illustrating an operation example of the optimization operation of the optical system 100.

Then, as illustrated in FIG. 7, the first adaptive optical controller 31 repeatedly executes the first optimization operation at periods Ta, and the second adaptive optical controller 32 repeatedly executes the second optimization operation at periods Tb so that convergence occurs in the time zone T1 within the period T of an atmospheric fluctuation change. The period Ta of the first optimization operation is, for example, 0.3 ms, and convergence occurs by, for example, about 15 times. Further, the period Tb of the second optimization operation is, for example, 60 µs, and convergence occurs by, for example, about 75 times. Therefore, in this case, the first optimization operation and the second optimization operation are configured so that the uneven shapes of the reflecting surfaces of the first deformable mirror 4 and the second deformable mirror 5 converge in 4.5 ms. In this configuration, an atmospheric compensation control bandwidth of about 270 Hz can be obtained.

As described above, the adaptive optical apparatus 1 performs compensation using the optimization method to repeatedly change the uneven shapes of the reflecting surfaces of the deformable mirrors using detected values of the metric sensors (the first metric sensor 8 and the second metric sensor 9) as an evaluation function, even if a spiral component of phase is generated under conditions where atmospheric fluctuations are strong, or the like, compensation for this can be performed with high accuracy. Specifically, a spiral component of phase may occur, and a large step-like component may occur in the optical wavefront. However, it is difficult to correctly measure this step-like component with, for example, a Shack-Hartmann type wavefront sensor that divides a wavefront shape, for example an incident beam cross-section, into a plurality of sub-apertures, and uses the light collecting position in each sub-aperture as an average wavefront slope so as to reproduce the entire wavefront shape, and if compensation control is performed based on this, the degree of concentration is degraded conversely. However, since the adaptive optical apparatus 1, by the optimization method, takes the process of changing the uneven shape of the reflecting surface of the deformable mirror to a shape that finally increases the degree of concentration even if the step-like component is present, even under conditions where atmospheric fluctuations are strong, or the like, if control speed can follow the speed of the atmospheric fluctuations, the compensation can be performed accurately.

Incidentally, as compared with the adaptive optical apparatus using the wavefront sensor, the adaptive optical apparatus to which the optimization method is applied requires an overwhelmingly high control speed when following atmospheric fluctuations at the same speed. Thus, it has been difficult to ensure a practically adequate control speed under conditions where atmospheric fluctuations are strong to perform sufficient compensation. In the adaptive optical apparatus 1, during the optimization, the first adaptive optical controller 31 controls the first deformable mirror 4 to perform compensation for the optical wavefront, and at the same time, the second adaptive optical controller 32 controls the second deformable mirror 5 to perform the compensation, two control loops being configured to perform optimization independently of one another. Therefore, a control speed capable of following the speed of atmospheric fluctuations can be ensured. That is, the optimization method can be applied to an adaptive optical apparatus used under conditions where atmospheric fluctuations are strong, and compensation for a high-order optical wavefront under conditions where atmospheric fluctuations are strong can be accurately performed.

Furthermore, in the first optimization by the first adaptive optical controller 31 using the first deformable mirror 4 and the first sub-deformable mirror 14 having a long stroke and a low speed, compensation for a wavefront error of relatively low order, which changes slowly, is mainly performed, and in the second optimization by the second adaptive optical controller 32 using the second deformable mirror 5 and the second sub-deformable mirror 15 having a short stroke and a high speed, compensation for a wavefront error of relatively high order, which changes quickly, is performed. Thus, the order of a wavefront distortion in compensation for a wavefront error can be efficiently shared, and the control speed can be further improved.

Further, since the optical path is split into the first optical path L1 and the second optical path L2 by the third beam splitter 13, it is possible to prevent the change in shape (perturbation) of the first sub-deformable mirror 14 in above-described step S12 and step S14 of the first optimization operation from affecting the detected value of the second metric sensor 9 in the second optimization operation, that is, the evaluation function in the optimization, and interfering with the second optimization operation. Similarly, it is possible to prevent the change in shape (perturbation) of the second sub-deformable mirror 15 in above-described step S22 and step S24 of the second optimization operation from affecting the detected value of the first metric sensor 8 in the first optimization operation, that is, the evaluation function in the optimization, and interfering with the second optimization operation.

Then, since the optical path on the outgoing path side and the optical path on the return path side between the irradiated object A and the second deformable mirror 5 are configured to be the same path, by performing a compensation operation for correcting the influence of atmospheric fluctuations on the return path side, similar compensation can be performed on the outgoing path side.

Modification Example

In addition, the first deformable mirror 4 and the first sub-deformable mirror 14 may have a high speed and a short stroke and the second deformable mirror 5 and the second sub-deformable mirror 15 may have a low speed and a long stroke, and the second optimization operation may be executed on the first deformable mirror 4 and the first sub-deformable mirror 14 and the first optimization operation may be executed on the second deformable mirror 5 and the second sub-deformable mirror 15.

Further, in the above embodiment, the order of the wavefront distortion is shared by two optimization operations, the first optimization operation by the first adaptive optical controller 31 using the first deformable mirror 4 and the first sub-deformable mirror 14, and the second optimization operation by the second adaptive optical controller 32 using the second deformable mirror 5 and the second sub-deformable mirror 15, but the present invention is not limited thereto. For example, the order of the wavefront distortion may be shared by three or more optimization operations.

Embodiment 2

Hereinafter, a configuration and operation of the optical system 200 including an adaptive optical apparatus 201 according to Embodiment 2 will be described focusing on differences from Embodiment 1.

[Configuration]

Figure 8:
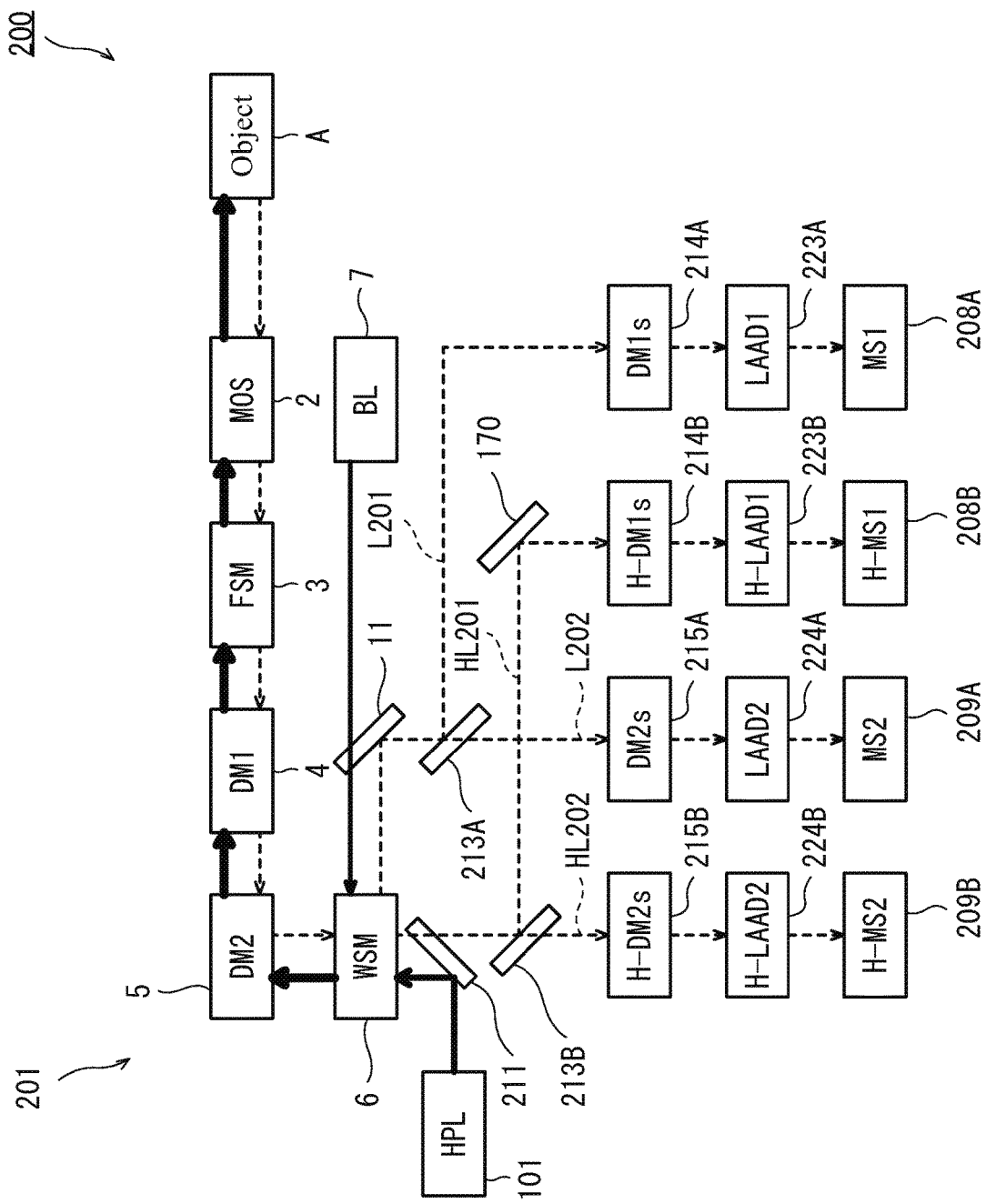
FIG. 8 is a block diagram illustrating a configuration example of an optical system including an adaptive optical apparatus according to Embodiment 2 and a configuration example of an optical path of a beacon laser when oscillating the beacon laser.
Figure 9:
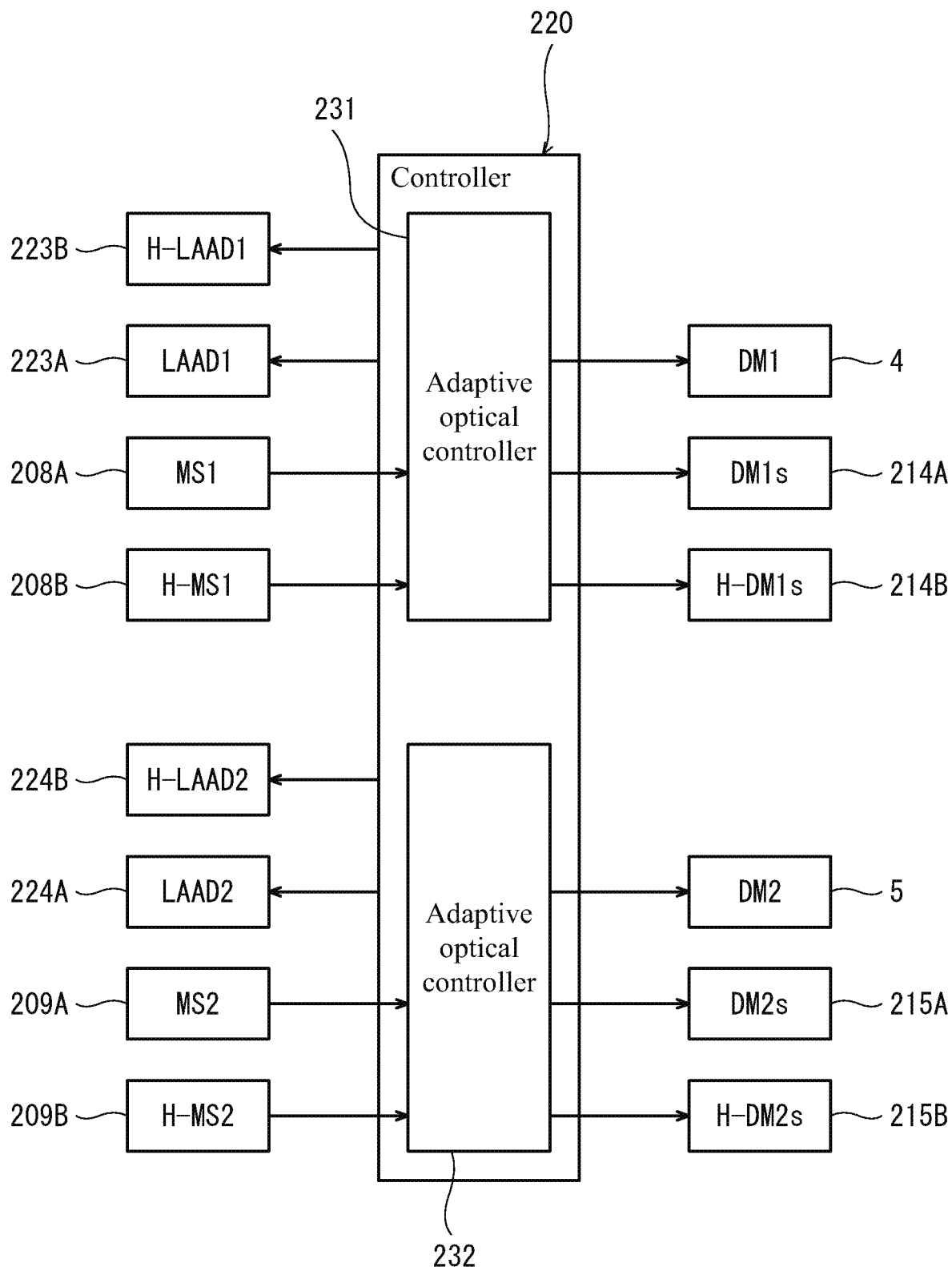
FIG. 9 is a block diagram schematically illustrating a configuration example of a control system of the optical system of FIG. 8.

FIG. 8 is a block diagram illustrating a configuration example of an optical system 200 according to Embodiment 2, and a configuration example of optical paths of a beacon laser and a main laser when oscillating the beacon laser and the main laser. FIG. 9 is a block diagram schematically illustrating a configuration example of a control system of the optical system 200 according to Embodiment 2.

As illustrated in FIGS. 8 and 9, the adaptive optical apparatus 201 according to Embodiment 2 includes a magnifying optical system 2, a fast steering mirror 3, a first deformable mirror 4, a second deformable mirror 5, a wavelength separating mirror 6, a beacon laser oscillator 7, a high-power laser oscillator 101, a first metric sensor 208A, a first metric sensor 208B for main laser, a second metric sensor 209A, a second metric sensor 209B for main laser, a tilt sensor 10, a first beam splitter 11, a second beam splitter 12, a third beam splitter 213A, a third beam splitter 213B for main laser, a first sub-deformable mirror 214A, a first sub-deformable mirror 214B for main laser, a second sub-deformable mirror 215A, a second sub-deformable mirror 215B for main laser, a first light amount adjusting device 223A, a first light amount adjusting device 223B for main laser, a second light amount adjusting device 224A, a second light amount adjusting device 224B for main laser, a controller 220 including a first adaptive optical controller 231 and a second adaptive optical controller 232, and a high-power laser reflecting mirror 211 with light amount monitoring function. Note that in FIGS. 8 and 9, the tilt sensor 10, the second beam splitter 12, and the tip-tilt controller 33 of Embodiment 1 are omitted in the illustrations, but in Embodiment 2, the adaptive optical apparatus 1 includes them similar to Embodiment 1, and performs correction of a tip-tilt component of a wavefront using the fast steering mirror 3. Light from the third beam splitter 213B which passes to the first sub-deformable mirror 214B for main laser may be reflected off of a mirror 170.

The optical system 200 guides each of light reflected by the wavelength separating mirror 6 and light transmitted through the wavelength separating mirror 6 in the optical path on the return path side, so that return light of main laser and return light of the beacon laser (laser light reflected at an irradiated object A) are separated and split into two different optical paths. Then, the return light of the beacon laser having passed through the wavelength separating mirror 6 passes through the first beam splitter 11, the first sub-deformable mirror 214A, and the first light amount adjusting device 223A in this order and reaches the first metric sensor 208A. At this time, part of the return light having reached the third beam splitter 213A passes through the second sub-deformable mirror 215A and the second light amount adjusting device 224A in this order, and reaches the second metric sensor 209A.

Further, the return light of the main laser having passed through the wavelength separating mirror 6 is guided to an optical path different from the optical path of the return light of the beacon laser, and transmitted through the high-power laser reflecting mirror 211 with light amount monitoring function, and passes through the third beam splitter 213B, the first sub-deformable mirror 214B for main laser, and the first light amount adjusting device 223B for main laser in this order and reaches the first metric sensor 208B for main laser. In addition, at this time, part of the return light having reached the third beam splitter 213B for main laser passes through the second sub-deformable mirror 215B for main laser and the second light amount adjusting device 224B for main laser in this order, and reaches the second metric sensor 209B for main laser.

The high-power laser reflecting mirror 211 with light amount monitoring function is constructed by applying a high reflection coating to a front surface of a substrate material such as synthetic quartz having a very high transmittance to a main laser wavelength and an anti-reflection coating to a back surface thereof. In the optical path on the return path side, when the return light of the main laser incident from the wavelength separating mirror 6 reflects on the high-power laser reflecting mirror 211 with light amount monitoring function, a small amount of light transmitted through the high reflection coating on the front surface is used as monitor light to be incident on the first metric sensor 208B for main laser and the second metric sensor 209B for main laser.

The first sub-deformable mirror 214A is in a first optical path L201 described later in the optical path of return light of the beacon laser on the return path side, and reflects light coming via the third beam splitter 213A (light reflected by the third beam splitter 213A) that is return light of the beacon laser coming via the wavelength separating mirror 6 from the first deformable mirror 4 and the second deformable mirror 5.

The second sub-deformable mirror 215A is in a second optical path L202 different from the first optical path L201 described later in the optical path of return light of the beacon laser on the return path side, and reflects light coming via the third beam splitter 213A (light transmitted through the third beam splitter 213A) that is return light of the beacon laser coming via the wavelength separating mirror 6 from the first deformable mirror 4 and the second deformable mirror 5.

The first sub-deformable mirror 214B for main laser is in a main laser first optical path HL201 described later in the optical path of return light of the main laser on the return path side, and reflects light coming via the third beam splitter 213B (light reflected by the third beam splitter 213B for main laser) that is the return light of the main laser coming via the wavelength separating mirror 6 from the first deformable mirror 4 and the second deformable mirror 5.

The second sub-deformable mirror 215B for main laser is in a main laser second optical path HL202 different from the main laser first optical path HL201 described later in the optical path of return light of the main laser on the return path side, and reflects light coming via the third beam splitter 213B (light transmitted through the third beam splitter 213B for main laser) that is the return light of the main laser coming via the wavelength separating mirror 6 from the first deformable mirror 4 and the second deformable mirror 5.

The first metric sensor (MS1) (first detector) 208A detects light intensity of return light of the beacon laser coming via the first sub-deformable mirror 214A, and outputs a detected value. The detected value output from the first metric sensor 208A is input to the first adaptive optical controller 231.

The other configuration of the first metric sensor 208A is similar to that of the first metric sensor 8 of above Embodiment 1, and thus the description thereof will be omitted.

The second metric sensor (MS2) (second detector) 209A detects light intensity of return light of the beacon laser coming via the second sub-deformable mirror 215A, and outputs a detected value. The detected value output from the second metric sensor 209A is input to the second adaptive optical controller 232. The other configuration of the second metric sensor 209A is similar to that of the second metric sensor 9 of above Embodiment 1, and thus the description thereof will be omitted.

The first metric sensor (H-MS1) for main laser (first high-power laser detector) 208B detects light intensity of return light of the main laser coming via the first sub-deformable mirror 214B for main laser, and outputs a detected value. The detected value output from the first metric sensor 208B for main laser is input to the first adaptive optical controller 231. The other configuration of the first metric sensor 208B for main laser is similar to that of the first metric sensor 208A, and thus the description thereof will be omitted.

The second metric sensor (H-MS2) for main laser (second high-power laser detector) 209B detects light intensity of return light of the main laser coming via the second sub-deformable mirror 215B for main laser, and outputs the detected value. The detected value output from the second metric sensor 209B for main laser is input to the second adaptive optical controller 232. The other configuration of the second metric sensor 209B for main laser is similar to that of the second metric sensor 9 of above Embodiment 1, and thus the description thereof will be omitted.

The first light amount adjusting device (LAAD1) 223A is to be interposed between the first sub-deformable mirror 214A and the first metric sensor 208A in the optical path of return light of the beacon laser on the return path side. The first light amount adjusting device 223A adjusts the light amount of the beacon laser having passed through the first light amount adjusting device 223A and is incident on the first metric sensor 208A.

The second light amount adjusting device (LAAD2) 224A is to be interposed between the second sub-deformable mirror 215A and the second metric sensor 209A in the optical path of return light of the beacon laser on the return path side. The second light amount adjusting device 224A adjusts the light amount of the beacon laser having passed through the second light amount adjusting device 224A and is incident on the second metric sensor 209A.

The first light amount adjusting device (H-LAAD1) 223B for main laser (high-power laser light amount adjusting unit)

is to be interposed between the first sub-deformable mirror 214B for main laser and the first metric sensor 208B for main laser in the optical path of return light of the main laser on the return path side. The first light amount adjusting device 223B for main laser adjusts the light amount of the main laser having passed through the first light amount adjusting device 223B for main laser and is incident on the first metric sensor 208B for main laser.

The second light amount adjusting device (H-LAAD2) 224B for main laser is to be interposed between the second sub-deformable mirror 215B for main laser and the second metric sensor 209B for main laser in the optical path of return light of the main laser on the return path side. The second light amount adjusting device 224B for main laser adjusts the light amount of the main laser having passed through the second light amount adjusting device 224B for main laser and is incident on the second metric sensor 209A.

Each of the first light amount adjusting device 223A, the second light amount adjusting device 224A, the first light amount adjusting device 223B for main laser, and the second light amount adjusting device 224B for main laser is, for example, an adjustment mechanism that switches insertion of a reflection type ND (Neutral Density) filter having several reflectances by external control drive, as a light amount control method that does not disturb a wavefront state of the return light. The light amount adjusting devices may be considered light attenuators.

The controller 220 controls oscillation of laser of the beacon laser oscillator 7 and the high-power laser oscillator 101. Further, the controller 220 controls the first light amount adjusting device 223A to adjust the amount of passing light based on a detected value received from the first metric sensor 208A, so as to make light intensity of return light of the beacon laser incident on the first metric sensor 208A fall within a dynamic range (the maximum value and the minimum value of an amount of light distinguishable by a sensor) of the first metric sensor 208A. Similarly, the controller 220 controls the first light amount adjusting device 223B for main laser, the second light amount adjusting device 224A, and the second light amount adjusting device 224B for main laser to adjust the amount of laser light passing through the light amount adjusting devices and is incident on a metric sensor based on a detected value received from a corresponding metric sensor, so as to make light intensity of laser light detected by the corresponding metric sensor fall within the dynamic range of the metric sensor.

In Embodiment 1, although the light amount adjusting devices are omitted in the illustrations, they may be utilized similar to this embodiment. In Embodiment 1 as in the present embodiment, a light amount adjusting device controlled by the controller 20 may be interposed between the first sub-deformable mirror 14 and the first metric sensor 8, and between the second sub-deformable mirror 15 and the second metric sensor 9.

The first adaptive optical controller 231 (first controller) selects one of the first metric sensor 208A and the first metric sensor 208B for main laser, and controls the drive unit 22 (see FIG. 3) of the first deformable mirror 4, the drive unit 52 of the first sub-deformable mirror 214A, and the drive unit 52 of the first sub-deformable mirror 214B for main laser based on a detected value received from the selected metric sensor.

The second adaptive optical controller 232 (second controller) selects one of the second metric sensor 209A and the second metric sensor 209B for main laser, and controls the drive unit 27 (see FIG. 3) of the second deformable mirror 5, the drive unit 52 of the second sub-deformable mirror 215A, and the drive unit 52 of the second sub-deformable mirror 215B for main laser based on a detected value received from the selected metric sensor. The other configurations of the first adaptive optical controller 231 and the second adaptive optical controller 232 are similar to those of the first adaptive optical controller 31 and the second adaptive optical controller 32, and thus the detailed description thereof will be omitted.

The third beam splitter 213A splits return light of the beacon laser coming via the wavelength separating mirror 6 and the first beam splitter 11 from the first deformable mirror 4 and the second deformable mirror 5 into the first optical path L201 and the second optical path L202. The third beam splitter 213B for main laser splits return light of the main laser coming via the wavelength separating mirror 6 and the high-power laser reflecting mirror 211 with light amount monitoring function from the first deformable mirror 4 and the second deformable mirror 5 into the main laser first optical path HL201 and the main laser second optical path HL202.

Operation Example

Next, an operation example of the optical system 200 will be described.

Figure 10:
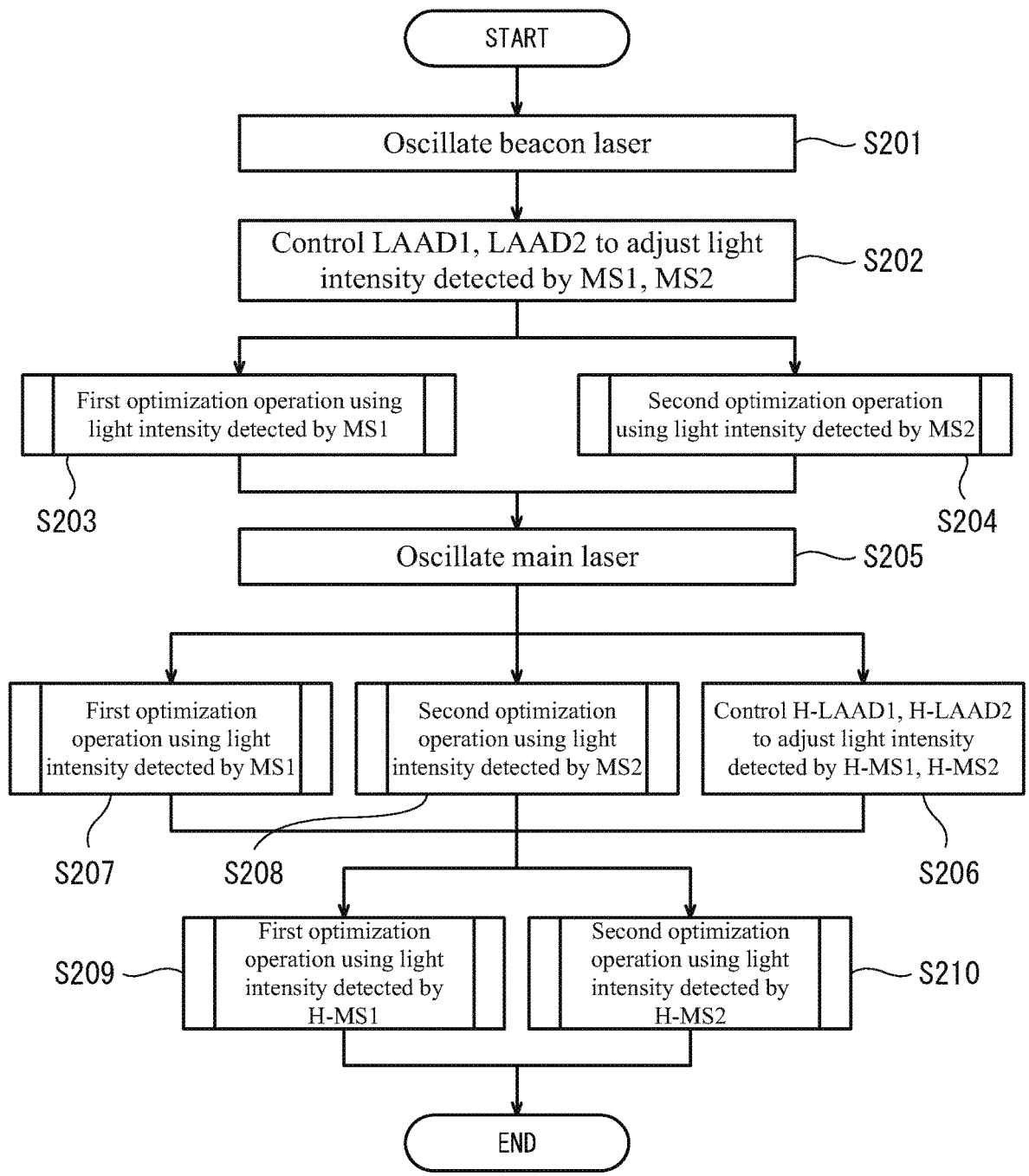
FIG. 10 is a flowchart illustrating an operation example of the optical system of FIG. 8.

FIG. 10 is a flowchart illustrating an operation example of the optical system 200.

First, the controller 220 causes the beacon laser oscillator 7 to oscillate laser light (beacon laser) (step S201). Then, the beacon laser is emitted to the outside of the optical system 200, propagates through the atmosphere, and reaches the irradiated object A. Thereafter, return light of the beacon laser reflected by the object A enters the optical system 200 as light having propagated through the atmosphere, and passes through the magnifying optical system 2, the fast steering mirror 3, the first deformable mirror 4, the second deformable mirror 5, the wavelength separating mirror 6, the first beam splitter 11, the third beam splitter 213A, the first sub-deformable mirror 214A, and the first light amount adjusting device 223A in this order and reaches the first metric sensor 208A, and the first metric sensor 208A detects a wavefront state of the reflected light affected by atmospheric fluctuations and outputs a detected value thereof. In addition, part of the return light of the beacon laser that has reached the third beam splitter 213A passes through the second sub-deformable mirror 215A and the second light amount adjusting device 224A in this order and reaches the second metric sensor 209A, and the second metric sensor 209A detects a wavefront state of the reflected light affected by atmospheric fluctuations and outputs a detected value.

Next, the controller 220 controls the first light amount adjusting device 223A to adjust the amount of light passing through the first light amount adjusting device 223A and adjust the amount of light incident on the first metric sensor 208A based on a detected value output from the first metric sensor 208A, so as to make the amount of light of return light of the beacon laser incident on the first metric sensor 208A fall within the dynamic range of the first metric sensor 208A. Further, the controller 220 controls the second light amount adjusting device 224A to adjust the amount of light passing through the second light amount adjusting device 224A and adjust the amount of light incident on the second metric sensor 209A based on a detected value output from the second metric sensor 209A, so as to make the amount of light of return light of the beacon laser incident on the second metric sensor 209A fall within the dynamic range of the second metric sensor 209A (step S202).

After the adjustment of the amount of light passing through the first light amount adjusting device 223A and the second light amount adjusting device 224A is completed, next, the first adaptive optical controller 231 repeatedly executes the first optimization operation using the light intensity of laser light detected by the first metric sensor 208A (step S203).

Further, in parallel with the first adaptive optical controller 231 repeatedly executing the first optimization operation, the second adaptive optical controller 232 repeatedly executes the second optimization operation (step S204).

Since these first and second optimization operations are similar to the first optimization operation (steps S11 to S18) and the second optimization operation (steps S21 to S28) of above Embodiment 1 except that the first metric sensor 208A and the second metric sensor 209A are used instead of the first metric sensor 8 and the second metric sensor 9, respectively, for light intensity evaluation, the detailed description thereof will be omitted.

Next, in addition to the beacon laser, the controller 220 causes the high-power laser oscillator 101 to oscillate laser light (main laser) (step S205). The main laser and the beacon laser are superimposed on the same optical path by passing through the wavelength separating mirror 6, and are emitted to the outside of the optical system 200. Then, the superimposed main laser and beacon laser are emitted to the outside of the optical system 200, propagate through the atmosphere, and reach the irradiated object A. Thereafter, return light of the main laser reflected by the object A enters the optical system 200 as light having propagated through the atmosphere, is guided by the wavelength separating mirror 6 to an optical path different from the optical path of the beacon laser, passes through the high-power laser reflecting mirror 211 with light amount monitoring function, the third beam splitter 213B for main laser, the first sub-deformable mirror 214B for main laser, and the first light amount adjusting device 223B for main laser in this order and reaches the first metric sensor 208B for main laser, and the first metric sensor 208B for main laser detects a wavefront state of the reflected light affected by atmospheric fluctuations and outputs a detected value. Further, part of the return light of the main laser that has reached the third beam splitter 213B for main laser passes through the second sub-deformable mirror 215B for main laser and the second light amount adjusting device 224B for main laser in this order and reaches the second metric sensor 209B for main laser, and the second metric sensor 209B for main laser detects a wavefront state of the reflected light affected by atmospheric fluctuations and outputs a detected value.

Next, the controller 220 adjusts the amount of light passing through the first light amount adjusting device 223B for main laser and adjusts the amount of light incident on the first metric sensor 208B for main laser based on a detected value output from the first metric sensor 208B for main laser, so as to make the amount of light of return light of the main laser incident on the first metric sensor 208B for main laser fall within the dynamic range of the first metric sensor 208B for main laser (first light amount adjusting operation). Further, the controller 220 adjusts the amount of light passing through the second light amount adjusting device 224B for main laser and adjust the amount of light incident on the second metric sensor 209B for main laser based on a detected value output from the second metric sensor 209B for main laser, so as to make the amount of light of return light of the main laser incident on the second metric sensor 209B for main laser fall within the dynamic range of the second metric sensor 209B for main laser (second light amount adjusting operation) (step S206).

Then, while the controller 220 is adjusting the amount of light passing through the first light amount adjusting device 223B for main laser and the second light amount adjusting device 224B for main laser, the first adaptive optical controller 231 continues to repeatedly execute the first optimization operation using the light intensity of the return light of the beacon laser detected by the first metric sensor 208A (step S207), and the second adaptive optical controller 232 continues to repeatedly execute the second optimization operation using the light intensity of the return light of the beacon laser detected by the second metric sensor 209A (step S208). Since the beacon laser and the main laser are superimposed on the same optical path, the wavefront error of the main laser can be compensated for by compensating for the optical wavefront using the light intensity of return light of the beacon laser.

In the present embodiment, the first adaptive optical controller 231 and the second adaptive optical controller 232 continue to execute the optimization operation using the light intensity of the return light of the beacon laser detected by the first metric sensor 208A and the second metric sensor 209A when starting irradiation of the main laser, and thus it is possible to compensate for wavefront errors of the main laser due to the influence of atmospheric fluctuations when starting irradiation of the main laser.

Then, when adjustment of the amount of light passing through the first light amount adjusting device 223B for main laser and the second light amount adjusting device 224B for main laser (the first light amount adjusting operation and the second light amount adjusting operation) is completed, the first adaptive optical controller 231 of the controller 220 subsequently performs a switching process (first switching process) to switch, in the first optimization operation, an operation of updating the uneven shape of the reflecting surface 21 of the first deformable mirror 4 by controlling the drive unit 22 of the first deformable mirror 4 based on the detected value by the first metric sensor 208A when the uneven shape of the reflecting surface 51 of the first sub-deformable mirror 214A is changed by controlling the drive unit 52 of the first sub-deformable mirror 214A to an operation of updating the uneven shape of the reflecting surface 21 of the first deformable mirror 4 by controlling the drive unit 22 of the first deformable mirror 4 based on the detected value by the first metric sensor 208B for main laser when the uneven shape of the reflecting surface 51 of the first sub-deformable mirror 214B for main laser is changed by controlling the drive unit 52 of the first sub-deformable mirror 214B for main laser, so as to repeatedly execute the first optimization operation (step S209). Further, the second adaptive optical controller 232 of the controller 220 subsequently performs a switching process (second switching process) to switch, in the second optimization operation, an operation of updating the uneven shape of the reflecting surface 26 of the second deformable mirror 5 by controlling the drive unit 27 of the second deformable mirror 5 based on the detected value by the second metric sensor 209A when the uneven shape of the reflecting surface 56 of the second sub-deformable mirror 215A is changed by controlling the drive unit 57 of the second sub-deformable mirror 215A to an operation of updating the uneven shape of the reflecting surface 26 of the second deformable mirror 5 by controlling the drive unit 27 of the second deformable mirror 5 based on the detected value by the second metric sensor 209B for main laser when the uneven shape of the reflecting surface 56 of the second sub-deformable mirror 215B for main laser is changed by controlling the drive unit 57 of the second sub-deformable mirror 215B for main laser, so as to repeatedly execute the second optimization operation (step S210).

That is, in the first and second optimization operations after these switching processes, while the first metric sensor 8 and the second metric sensor 9 are used to evaluate the light intensity in above Embodiment 1, the first metric sensor 208B for main laser and the second metric sensor 209B for main laser are used instead. In above Embodiment 1, although the first sub-deformable mirror 14 and the second sub-deformable mirror 15 are used for perturbation, the first sub-deformable mirror 214B for main laser and the second sub-deformable mirror 215B for main laser are used instead. The other operations are similar to those of the first and second optimization operations (steps S1 to S18 and steps S21 to S28) of above Embodiment 1, and thus the detailed description thereof will be omitted.

Incidentally, in order to give commonality to disorder of the optical wavefront of the return light of the main laser reflected by the object A and disorder of the optical wavefront of the return light of the beacon laser reflected by the object A, it is necessary to superimpose the main laser accurately on the same optical path as the beacon laser, ad as a deviation between the optical path of the main laser in the atmosphere and the optical path of the beacon laser in the atmosphere increases, compensation performance (Straul ratio) of the optical wavefront for the main laser using the light intensity of the beacon laser decreases. However, the first adaptive optical controller 231 and the second adaptive optical controller 232 executes the first and second optimization operations using the light intensities of the main laser detected by the first metric sensor 208B for main laser and the second metric sensor 209B for main laser as soon as adjustment of the amount of light passing through the first light amount adjusting device 223B for main laser and the second light amount adjusting device 224B for main laser is completed, and thus compensation accuracy of the main laser can be increased.

Embodiment 3

An operation of an optical system of Embodiment 3 will be described below, focusing on differences from Embodiment 1.

Operation Example

Figure 11:
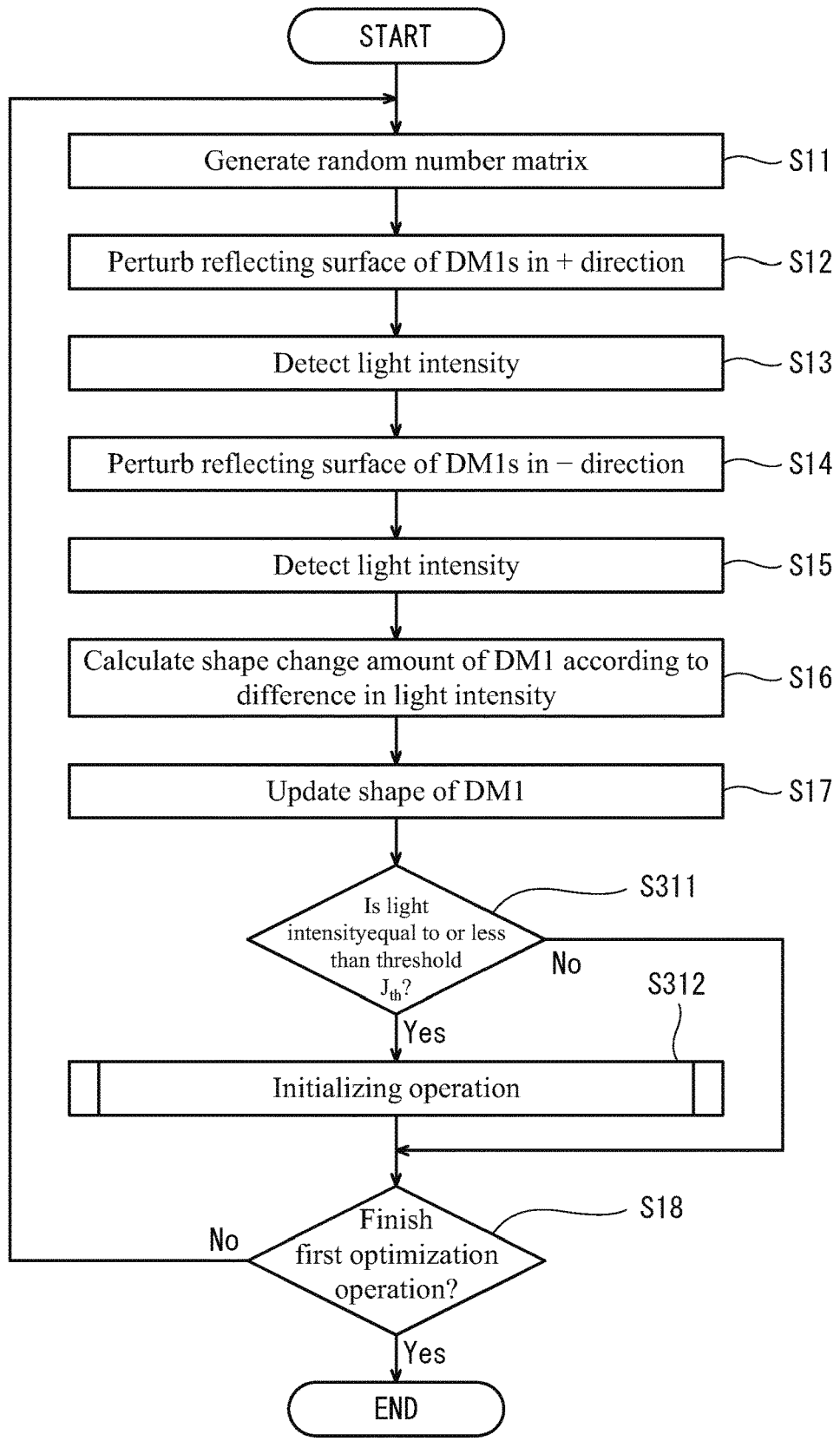
FIG. 11 is a flowchart illustrating an operation example of an optical system including an adaptive optical apparatus according to Embodiment 3, and is a chart illustrating a first optimization operation.

FIG. 11 is a flowchart illustrating an operation example of the optical system of Embodiment 3 and is a chart illustrating a first optimization operation.

As illustrated in FIG. 11, in the first optimization operation of the present embodiment, a first adaptive optical controller 31 of the optical system executes steps S311 and S312 before starting step S18 after completion of step S17 in the operation example of Embodiment 1.

Specifically, after completion of step S17, the first adaptive optical controller 31 determines whether light intensity detected by the first metric sensor 8 is less than or equal to a predetermined threshold $J_{th}$ (step S311). The predetermined threshold $J_{th}$ is calculated, for example, according to equation (6).

$$J_{th} = J_0 \cdot k_a \quad (6)$$

Here, $J_0$ is a value of light intensity detected by the first metric sensor 8 when the optimization operation is started.

$k_a$ is a predetermined coefficient (for example, 0.7).

When the first adaptive optical controller 31 determines that the light intensity detected by the first metric sensor 8 is equal to or higher than the predetermined threshold $J_{th}$ (No in step S311), the first adaptive optical controller 31 executes step S18 in the operation example of Embodiment 1. On the other hand, when the first adaptive optical controller 31 determines in step S311 that the light intensity detected by the first metric sensor 8 is less than or equal to the predetermined threshold $J_{th}$ (Yes in step S311), the first adaptive optical controller 31 executes an initializing operation of the first deformable mirror 4 (first initializing operation) (step S312). The first initializing operation of the first deformable mirror 4 is an operation of updating the uneven shape of the reflecting surface 26 of the first deformable mirror 4 to a predetermined initial shape (a shape when the first optimization operation is started). As described above, the first adaptive optical controller 31 repeatedly executes the optimization operation using the stochastic parallel gradient descent method to make the uneven shape of the reflecting surface of the deformable mirror to follow a change in atmospheric fluctuations. However, in the optimization operation, it may fall into a local optimum, that is, it may not be overall optimum but may be optimum in a certain local range, and if it falls into a local optimum, in some cases, the uneven shape of the reflecting surface of the deformable mirror cannot be changed so as to follow a change in atmospheric fluctuations, and the degree of concentration may be degraded. However, in the present embodiment, when the degree of concentration has deteriorated to a certain extent or more, that is, when the first adaptive optical controller 31 determines that the light intensity detected by the first metric sensor 8 is equal to or less than the predetermined threshold $J_{th}$, the first adaptive optical controller 31 executes the initializing operation of the first deformable mirror 4. Thus, it is possible to recover from a state of falling into a local optimum, and it is possible to prevent a state that the degree of concentration has deteriorated from continuing. Then, the first adaptive optical controller 31 of the optical system executes step S18 in the operation example of Embodiment 1.

Figure 12:
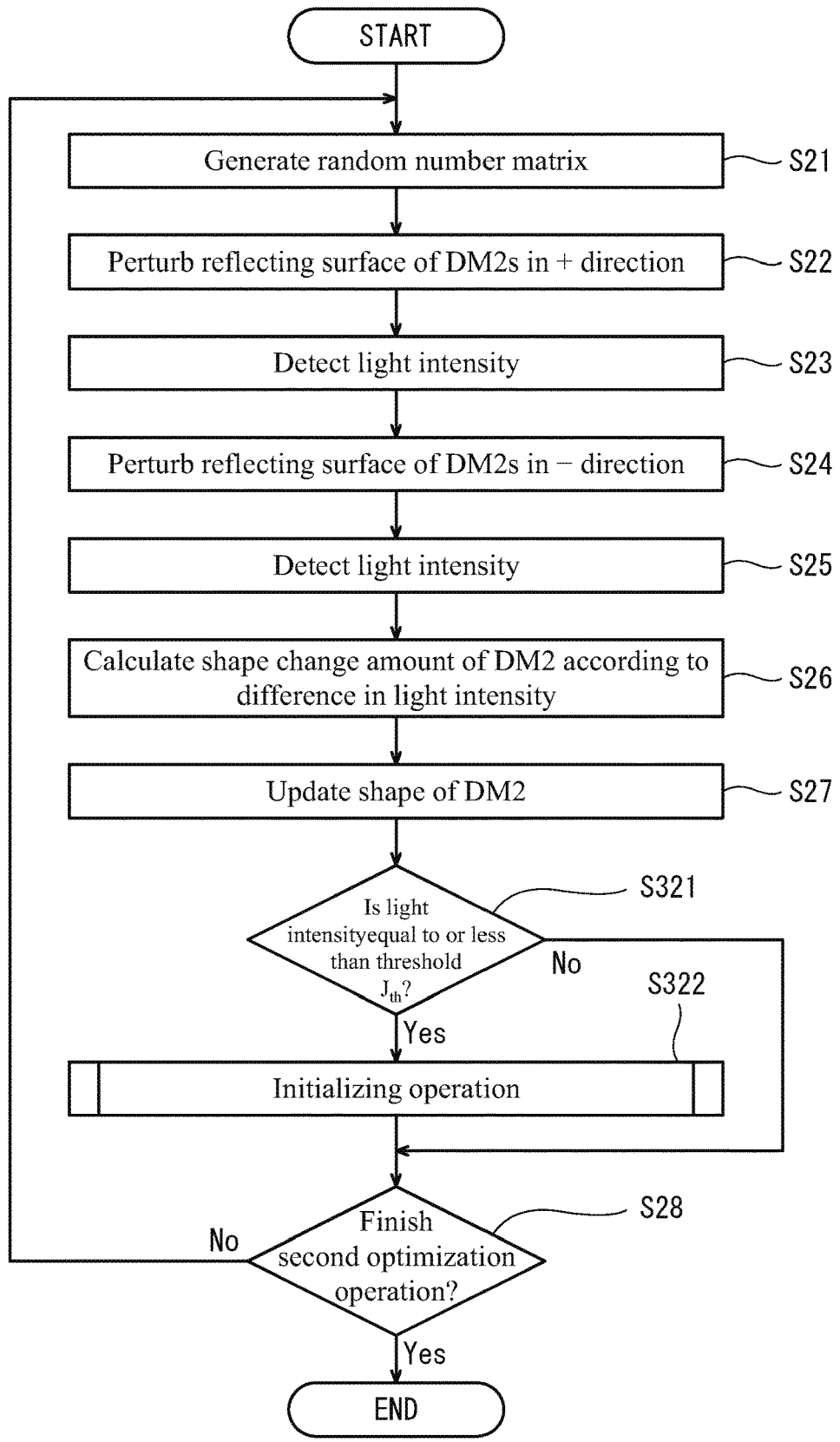
FIG. 12 is a flowchart illustrating an operation example of the optical system of FIG. 11, and is a chart illustrating a second optimization operation.

FIG. 12 is a flowchart illustrating an operation example of the optical system of Embodiment 3 and illustrates a second optimization operation.

Further, as illustrated in FIG. 12, in the second optimization operation of the present embodiment, a second adaptive optical controller 32 of the optical system, similar to the first optimization operation of the present embodiment, executes steps S321 and S322 before starting step S28 after completion of step S27 in the operation example of Embodiment 1. Steps S321 and S322 are processes similar to above step S311 and step S312, respectively.

Embodiment 4

A configuration and operation of an optical system 400 according to Embodiment 4 will be described below focusing on differences from Embodiment 1.

[Configuration]

Figure 13:
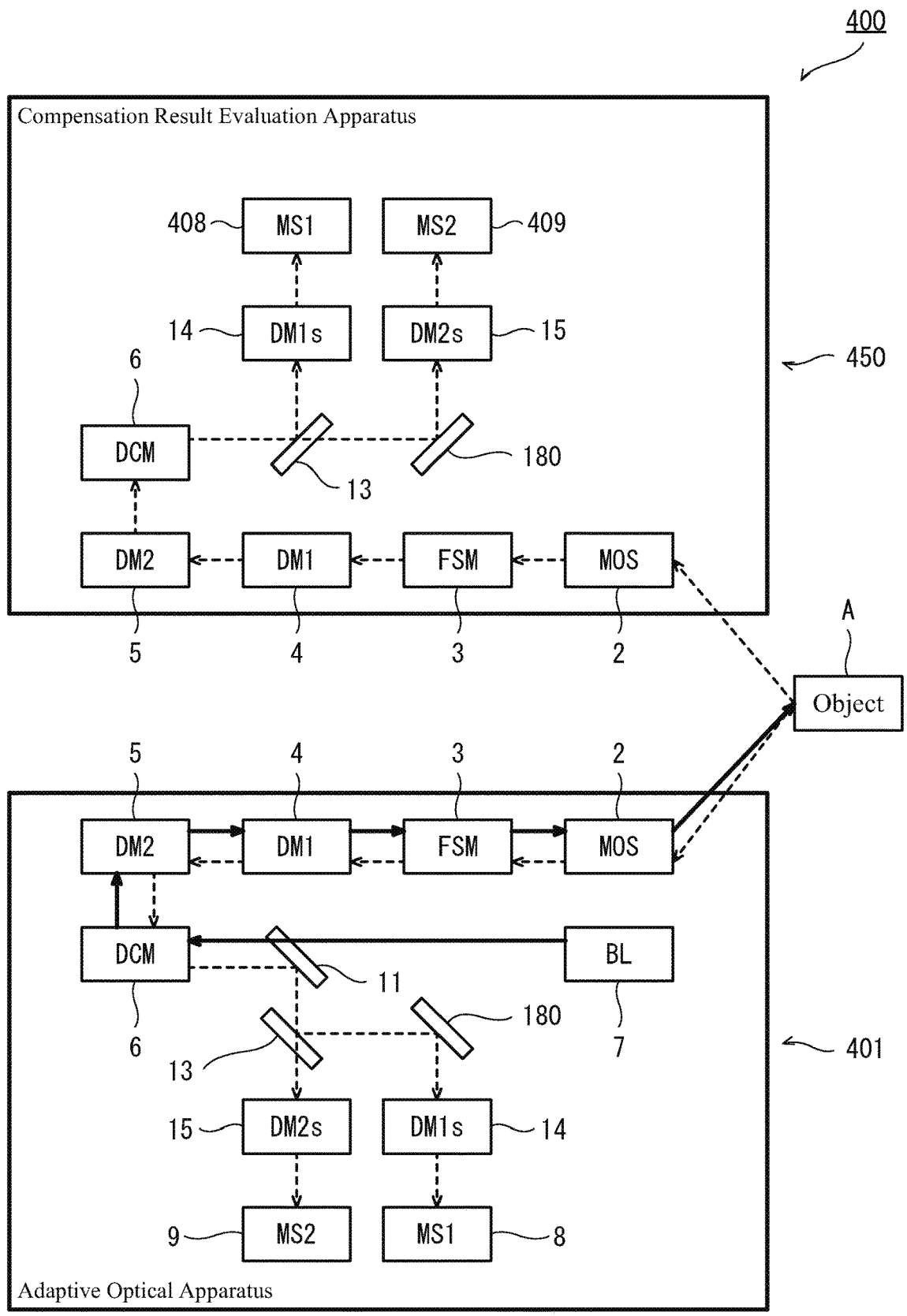
FIG. 13 is a block diagram illustrating a configuration example of an optical system including an adaptive optical apparatus according to Embodiment 4, and a configuration example of an optical path of a beacon laser when oscillating the beacon laser.
Figure 14:
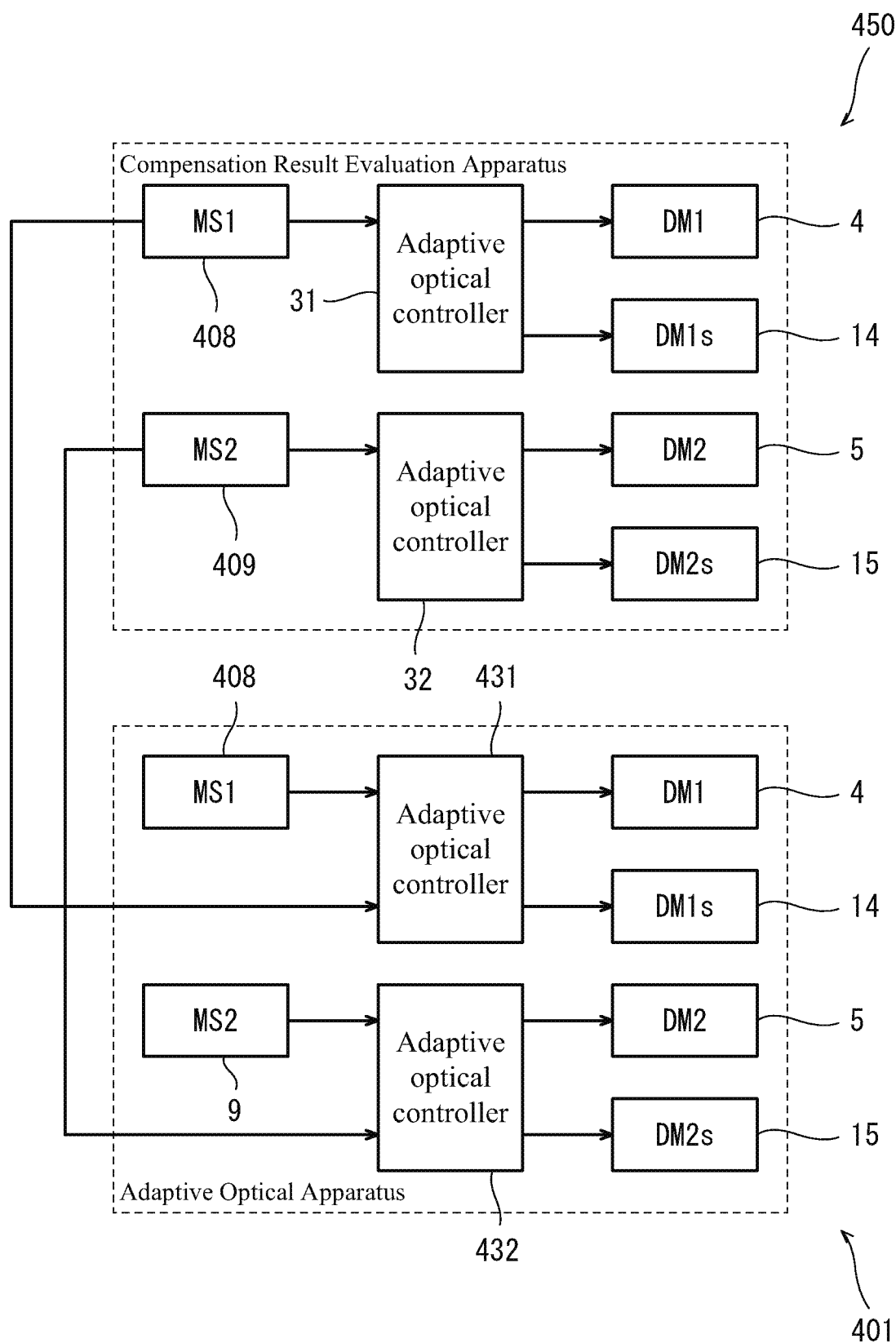
FIG. 14 is a block diagram schematically illustrating a configuration example of a control system of the optical system of FIG. 13.

FIG. 13 is a block diagram illustrating a configuration example of the optical system 400 according to Embodiment 4 and a configuration example of an optical path of a beacon laser when oscillating the beacon laser. FIG. 14 is a block diagram schematically illustrating a configuration example of a control system of the optical system 400 according to Embodiment 4.

As illustrated in FIGS. 13 and 14, the optical system 400 includes an adaptive optical apparatus 401 and a compensation result evaluation apparatus 450.

The adaptive optical apparatus 401 is similar to above Embodiment 1 except that, as shown in FIG. 14, a first adaptive optical controller 431 and a second adaptive optical controller 432 are used instead of the first adaptive optical controller 31 and the second adaptive optical controller 32, and thus the detailed description thereof will be omitted. Although the high-power laser oscillator 101, the second beam splitter 12, the tilt sensor 10, and the tip-tilt controller 33 are not illustrated in FIGS. 13 and 14, they are configured similar to those in above Embodiment 1.

The first adaptive optical controller 431 controls the drive unit 22 (see FIG. 3) of the first deformable mirror 4 and the drive unit 52 of the first sub-deformable mirror 14 of the adaptive optical apparatus 401 based on a detected value received from a first metric sensor 408 of the compensation result evaluation apparatus 450 described later, in addition to a detected value received from the first metric sensor 8. The other configuration of the first adaptive optical controller 431 is similar to that of the first adaptive optical controller 31, and thus the description thereof will be omitted.

The second adaptive optical controller 432 controls the drive unit 27 of the second deformable mirror 5 and the drive unit 57 of the second sub-deformable mirror 15 of the adaptive optical apparatus 401 based on to a detected value received from a second metric sensor 409 of the compensation result evaluation apparatus 450 described later, in addition to a detected value from the second metric sensor 9. The other configuration of the second adaptive optical controller 432 is similar to that of the second adaptive optical controller 32, and thus the description thereof will be omitted.

The compensation result evaluation apparatus 450 is an apparatus that detects light emitted from a beacon laser oscillator 7 of the adaptive optical apparatus 401, compensated for an optical wavefront and emitted, and reflected by an irradiated object A, and that detects and outputs an evaluation amount for evaluating the degree of compensation for atmospheric fluctuations of an optical path on an outgoing path side by the adaptive optical apparatus 401. The compensation result evaluation apparatus 450 does not include the beacon laser oscillator 7 and the high-power laser oscillator 101. Further, instead of the first metric sensor 8 and the second metric sensor 9, the first metric sensor 408 and the second metric sensor 409 are utilized. Then, the evaluation amount for evaluating the degree and state of compensation is, for example, a beam diameter of the beacon laser on the irradiated object A. In this case, the first metric sensor 408 and the second metric sensor 409 of the compensation result evaluation apparatus 450 may be, for example, an image sensor. Then, an image output of this image sensor is image-processed, and the beam diameter of the beacon laser on the irradiated object A is calculated. Then, this beam diameter is output a an evaluation amount $J_e$. The evaluation amounts k output from the first metric sensor 408 and the second metric sensor 409 are input to the first adaptive optical controller 31 and the second adaptive optical controller 32, respectively, of the compensation result evaluation apparatus 450, and also input to the first adaptive optical controller 431 and the second adaptive optical controller 432 of the adaptive optical apparatus 401. The configuration of the other compensation result evaluation apparatus 450 is similar to that of the adaptive optical apparatus 401, and thus the description thereof will be omitted. In FIG. 13, light from the third beam splitter 13 may be reflected off of a mirror 180 before reaching the first sub-deformable mirror 14 or the second sub-deformable mirror 15.

Operation Example

Next, an operation example of the optical system 400 will be described.

First, when the beacon laser oscillator 7 of the adaptive optical apparatus 401 oscillates laser light, the oscillated laser light is emitted to the outside of the optical system 400, propagates through the atmosphere, and reaches the irradiated object A.

Then, part of laser light reflected by the irradiated object A enters the adaptive optical apparatus 401 as light having propagated through the atmosphere, and reaches the first metric sensor 8 of the adaptive optical apparatus 401, and the first metric sensor 8 of the adaptive optical apparatus 401 detects light intensity of the reflected light. At the same time, part of the laser light reflected by the irradiated object A enters the compensation result evaluation apparatus 450 as light having propagated through the atmosphere, and reaches the first metric sensor (detector for evaluation) 408, and the first metric sensor 408 detects an evaluation amount $J_e$ of a compensation result by the adaptive optical apparatus 401.

Then, the adaptive optical controller (controller for evaluation) 31 of the compensation result evaluation apparatus 450 executes the first optimization operation by using an optimization method that repeatedly changes the uneven shape of the reflecting surface of the deformable mirror (deformable mirror for evaluation) using the evaluation amount $J_e$ of the first metric sensor 408 of the compensation result evaluation apparatus 450 as an evaluation function. This first optimization operation is an operation (imaging operation) of changing the uneven shape of the reflecting surface of the deformable mirror so that the evaluation amount $J_e$ improves, that is, the beam diameter which is the evaluation amount $J_e$ detected by the first metric sensor 408 is minimized. Since the imaging operation is similar to the first optimization operation of above Embodiment 1, the detailed description thereof will be omitted. Thus, the compensation result evaluation apparatus 450 can reduce errors of the evaluation amount of the compensation result caused by disturbance of an optical wavefront due to atmospheric fluctuations of the optical path on the return path side from the irradiated object A to the compensation result evaluation apparatus 450 from the evaluation amount $J_e$ of the compensation result by the adaptive optical apparatus 401, and the evaluation amount of the compensation result on the outgoing path side of the adaptive optical apparatus 401 having optical paths different from those of the compensation result evaluation apparatus 450 can be more reliably detected by the first metric sensor 408 even when it is strongly influenced by the disturbance of the optical wavefront due to atmospheric fluctuations of the optical path on the return path side.

Then, in parallel with the first optimization operation of the compensation result evaluation apparatus 450, the first adaptive optical controller 431 of the adaptive optical apparatus 401 executes the first optimization operation. In the first optimization operation in above Embodiment 1, the gain G in equation (3) is a predetermined value (constant). On the other hand, in the present embodiment, the gain G in equation (3) is a value calculated based on the first metric sensor 408 of the compensation result evaluation apparatus 450, and is a variable calculated according to, for example, equation (7).

$$G = -dJ_e/dt \cdot k_b + k_c \quad (7)$$

Here, $k_b$ and $k_c$ are predetermined coefficients. Specific values of the parameters $k_b$ and $k_c$ in depend on environmental conditions (such as a transmission range, a zenith angle, and an opening diameter) of an adaptive optical system. When the compensation is stabilized, kc becomes approximately the control gain G, and therefore, kc depends on a perturbation width. The value kb is a coefficient that determines the characteristics of the evaluation function J and depends on the specifications of an evaluation sensor. A non-limiting example of values for $k_b$ and $k_k$ is as follows. For preconditions, (i) $k_c$=0.2, (ii) When the evaluation function J uses a beacon beam diameter, a maximum change width of the evaluation function J is 60 mm, and (iii) One step of the shape update of DM takes 60 μs. In this case, the maximum value of the absolute value of the change rate −dJe/dt becomes −1,000 [m/s]. When $k_b$ is set such that the entire gain G does not exceed one, $K_b$ is 0.8/1,000 (=0.0008). This is one possible implementation, and any other desired values are possible for the parameters are possible.

Therefore, in the present embodiment, the gain G takes a large value when the amount of change in the evaluation amount detected by the first metric sensor 408 of the compensation result evaluation apparatus 450 is large in a desired direction, and the gain G takes a small value when the amount of change in the evaluation amount is large in an undesired direction. Here, when the evaluation amount is the beam diameter of the beacon laser on the irradiated object A, one in which it becomes smaller is a desirable direction, and thus the first term of the equation (7) has a minus sign. Further, if there is no change in the evaluation amount, it is determined that the compensation is stabilized, and the fixed gain value $G=k_c$ illustrated in the equation (3) of above Embodiment 1 is taken. As described above, in the present embodiment, the first adaptive optical controller 431 of the adaptive optical apparatus 401 uses, in addition to a detected value of the first metric sensor 8, a detected value of the first metric sensor 408 of the compensation result evaluation apparatus 450 as a secondary evaluation function, so as to update the uneven shape of the reflecting surface 21 of the first deformable mirror 4. Consequently, in the initial stage of the optimization operation or when a large atmospheric fluctuation occurs in a short time, the shape change amount of the first deformable mirror 4 can be increased, convergence of the reflecting surface 21 of the first deformable mirror 4 to the optimum shape can be accelerated, and a compensation control speed can be improved. On the other hand, in a state that the reflecting surface 21 of the first deformable mirror 4 is converging to the optimum shape, the shape change amount of the reflecting surface 21 of the first deformable mirror 4 can be reduced, and it is possible to prevent the degree of concentration from being conversely deteriorated by changing the reflecting surface 21 exceeding the optimum shape.

In addition, if the optical wavefront on the return path side detected by the first metric sensor 8 of the adaptive optical apparatus 401 originally comes as a point light source from the irradiated object A, only a wavefront distortion due to atmospheric fluctuations can be detected. However, in practice, since it becomes a wavefront of superposition of reflected light from finite areas in different surface states of the irradiated object A, the influence of a speckle pattern generated thereby cannot be ignored, and in some cases, disturbance of the optical wavefront on the outgoing path side not including the influence of reflection on the irradiated object A and disturbance of the optical wavefront on the return path side including the influence of reflection on the irradiated object A are largely different. In such cases, even if the reflected light is evaluated by the first metric sensor 8 of the adaptive optical apparatus 401, and a compensation operation of correcting the wavefront distortion is performed on the optical path on the return path side, there are cases where it is not possible to perform a compensation so as to cancel out a wavefront distortion effect due to atmospheric fluctuations on the optical path on the outgoing path side, and light collection performance cannot be increased. However, in the present embodiment, for the purpose of reducing the influence of reflecting state of the irradiated object A, the first metric sensor 408 of the compensation result evaluation apparatus 450 detects the evaluation amount of a result of correcting the influence of disturbance of the optical wavefront due to atmospheric fluctuations of the optical path on the outgoing path side, and the adaptive optical apparatus 401 performs the first optimization operation using this as a secondary evaluation function. Thus, it is possible to more reliably enhance light collection performance of laser light.

Although the first optimization operation has been described above, the second optimization operation is also similar. Specifically, the first deformable mirror 4, the first metric sensor 408, and the first adaptive optical controller 431 in the above operation example are replaced with the second deformable mirror 5, the second metric sensor 409, and the second adaptive optical controller 432, respectively, to thereby describe the second optimization operation.

Embodiment 5

The following describes a configuration and operation of an optical system 500 including an adaptive optical apparatus 501 according to Embodiment 5, focusing on differences from Embodiment 1.

[Configuration]

Figure 15:
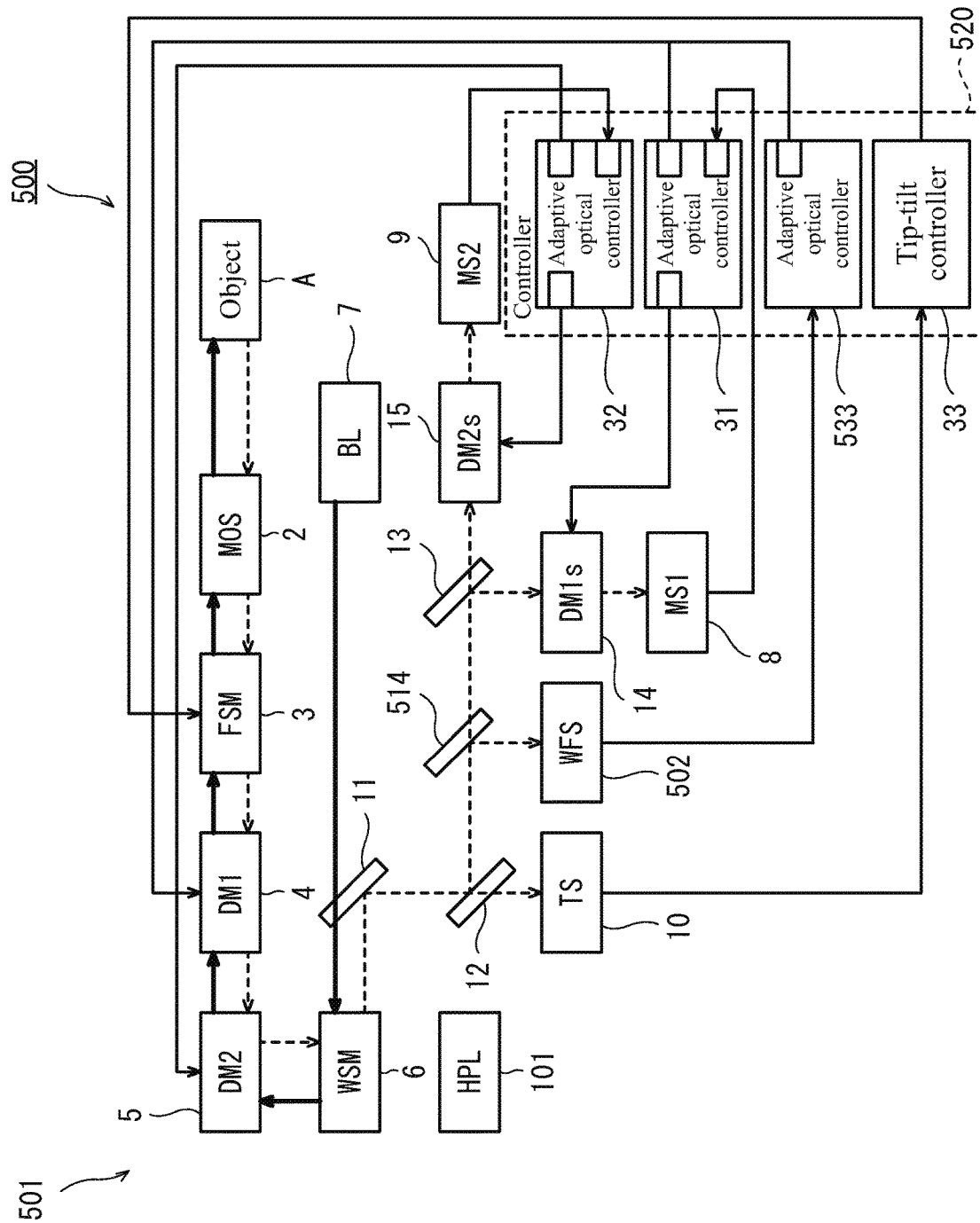
FIG. 15 is a block diagram illustrating a configuration example of an optical system including an adaptive optical apparatus according to Embodiment 5 and a configuration example of an optical path of a beacon laser when oscillating the beacon laser.

FIG. 15 is a block diagram illustrating a configuration example of the optical system 500 according to Embodiment 5 and a configuration example of an optical path of the beacon laser when oscillating the beacon laser.

As illustrated in FIG. 15, the adaptive optical apparatus 501 includes a magnifying optical system 2, a fast steering mirror 3, a first deformable mirror 4, a second deformable mirror 5, a wavelength separating mirror 6, a beacon laser oscillator. 7, a high-power laser oscillator 101, a first metric sensor 8, a second metric sensor 9, a tilt sensor 10, a wavefront sensor 502, a controller 520, a first beam splitter 11, a second beam splitter 12, a third beam splitter 13, and a fourth beam splitter 514. The magnifying optical system 2, the fast steering mirror 3, the first deformable mirror 4, the second deformable mirror 5, the wavelength separating mirror 6, the beacon laser oscillator 7, the high-power laser oscillator 101, the first metric sensor 8, the second metric sensor 9, the tilt sensor 10, the first beam splitter 11, the second beam splitter 12, and the third beam splitter 13 are configured similar to those in above Embodiment 1, and thus detailed descriptions thereof will be omitted.

The wavefront sensor (WFS wavefront shape detector) 502 is a sensor that detects a wavefront shape of laser light from the first deformable mirror 4 and the second deformable mirror 5 and outputs a detected value. The wavefront sensor 502 is, for example, the aforementioned Shack-Hartmann wavefront sensor.

The controller 520 includes a first adaptive optical controller 31, a second adaptive optical controller 32, a third adaptive optical controller 533, and a tip-tilt controller 33.

The first adaptive optical controller 31 and the second adaptive optical controller 32 are controllers that are configured similar to the first adaptive optical controller 31 and the second adaptive optical controller 32 of above Embodiment 1, and perform compensation using the optimization method that repeatedly changes the uneven shapes of the reflecting surfaces of the deformable mirrors using detected values of the first metric sensor 8 and the second metric sensor 9 as evaluation functions. In addition, since the tip-tilt controller 33 is similar to that of above Embodiment 1, the detailed description thereof will be omitted.

The third adaptive optical controller (WFR AO) 533 controls the drive unit 22 of the first deformable mirror 4 based on a wavefront shape received from the wavefront sensor 502. Further, the third adaptive optical controller 533 is configured to be able to execute a wavefront correction operation (details will be described later). The third adaptive optical controller 533 outputs a control signal to the first deformable mirror 4. The other configuration of the controller 520 is similar to that of the controller 20 according of above Embodiment 1, and thus the detailed description thereof will be omitted.

Similar to the first beam splitter 11, the second beam splitter 12, and the third beam splitter 13, the fourth beam splitter 514 partially reflects incident light and transmits remaining light, so as to split laser light into different optical paths, or merge (superimpose) optical paths of a plurality of laser lights of different optical paths into one optical path. The fourth beam splitter 514 is on an optical path between the second beam splitter 12 and the third beam splitter 13, and partially reflects, in an optical path on a return path side, laser light incident from the second beam splitter 12 (return light of the beacon laser), and reflected laser light is incident on the wavefront sensor 502. In addition, the fourth beam splitter 514 transmits remaining laser light, and the transmitted laser light is incident on the third beam splitter 13.

That is, in the present embodiment, the optical path on the return path side runs through the magnifying optical system 2, the fast steering mirror 3, the first deformable mirror 4, the second deformable mirror 5, the wavelength separating mirror 6, and the first beam splitter 11 in this order and reaches the second beam splitter 12, and is split in the second beam splitter 12 into an optical path toward the tilt sensor 10 and an optical path toward the fourth beam splitter 514. Further, in the fourth beam splitter 514, the optical path is split into an optical path toward the third beam splitter 13 and an optical path toward the wavefront sensor 502.

Operation Example

Figure 16:
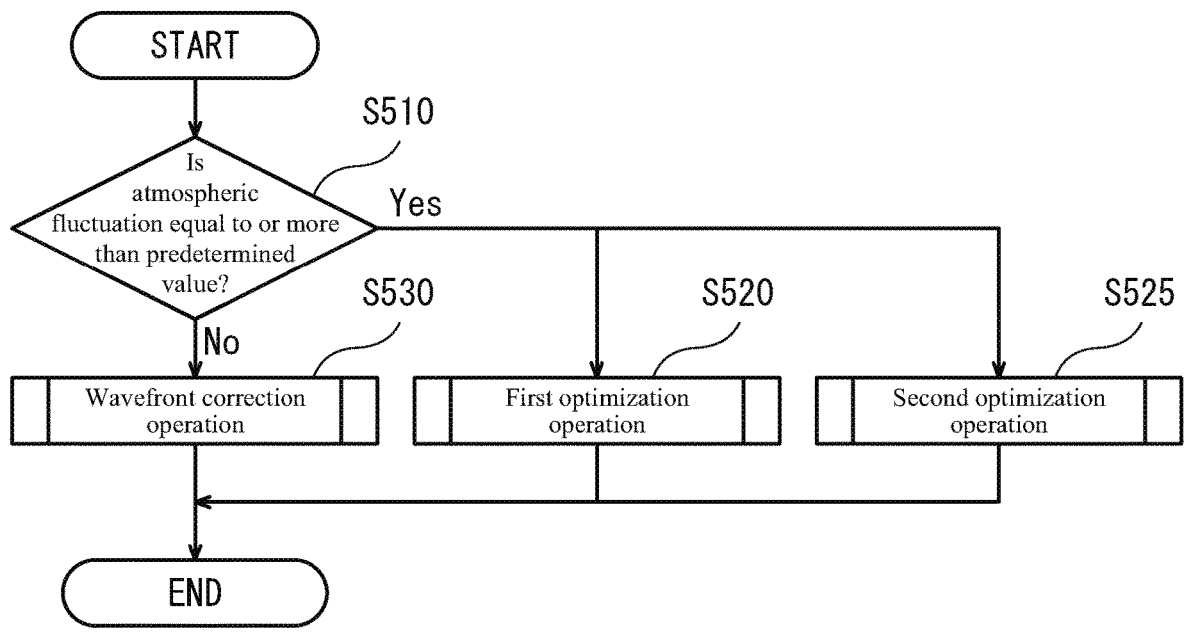
FIG. 16 is a flowchart illustrating an operation example of the optical system of FIG. 15.

Next, an operation example of the optical system 500 will be described FIG. 16 is a flowchart illustrating an operation example of the optical system 500.

First, the controller 520 determines which of the optimization operation, including the first optimization operation and the second optimization operation, and the wavefront correction operation is to be performed according to the intensity of atmospheric fluctuations (step S510). For example, when the controller 520 determines that it is under strong atmospheric fluctuation conditions such that a Rytov number (logarithmic amplitude dispersion) which can be calculated from a measurement value of the first metric sensor 8 exceeds 0.2 (Rytov number is 0.2 or more) (Yes in step S510), the controller 520 performs the first optimization operation and the second optimization operation (steps S520, S525). The optimization operation in the present embodiment is similar to the first optimization operation and the second optimization operation in Embodiment 1 described above, and thus the detailed description thereof will be omitted.

Further, when the controller 520 determines that it is under weak atmospheric fluctuation conditions such that the Rytov number is below 0.2 (Rytov number is less than 0.2) (No in step S510), the wavefront correction operation is performed (step S530). In the wavefront correction operation, the controller 520 sets the shape of the reflecting surface 26 of the second deformable mirror 5 to a predetermined initial shape. The predetermined initial shape is, for example, a flat surface. At the same time, the third adaptive optical controller 533 of the controller 520 controls the drive unit 22 of the first deformable mirror 4 to change the uneven shape of the reflecting surface 21 of the first deformable mirror 4 so as to correct the wavefront distortion based on the wavefront shape of laser light detected by the wavefront sensor 502.

As described above, in the present embodiment, the optical system 500 is configured to properly use, depending on the situation, both of the first optimization operation and the second optimization operation using the optimization method and the wavefront correction operation that directly detects a shape of an optical wavefront, and corrects a detected optical wavefront distortion. In this manner, under conditions where atmospheric fluctuations are weak and there is no possibility that a large step-like component is generated in the optical wavefront, or the like, a wavefront distortion due to the influence of atmospheric fluctuations is measured by a wavefront sensor and is fed back directly to the deformable mirror for correction by the wavefront correction operation. Thus, a margin can be added to the processing speed.

Embodiment 6

In the present embodiment, the first adaptive optical controller 31 restricts an operating amount randomly selected for each of the plurality of drive elements 53 of the first sub-deformable mirror 14 so that the shape of the reflecting surface 51 of the first sub-deformable mirror 14 defined by adding a first shape change amount to a first reference shape has a tip-tilt component that is equal to or smaller than a threshold.

That is, the first adaptive optical controller 31 generates a random number matrix R so that the reflecting surface 51 of the first sub-deformable mirror 14 has a tip-tilt component equal to or smaller than the threshold if a plus dither and a minus dither are given in steps S12 and S14 based on the random number matrix R generated in step S11. Whether or not the reflecting surface 51 of the first sub-deformable mirror 14 has a tip-tilt component equal to or less than the threshold may be determined by calculating an average inclination of the reflecting surface 51 in a case where it is assumed that a force in proportion to the corresponding element of the random number matrix R operates in a normal direction of the reflecting surface 51 to each portion of the reflecting surface 51 on which each drive element 53 is provided, and determining that the reflecting surface 51 of the first sub-deformable mirror 14 has a tip-tilt component equal to or less than the threshold when the calculated average inclination is equal to or less than the threshold, or determining that the reflecting surface 51 of the first sub-deformable mirror 14 has a tip-tilt component exceeding the threshold when the calculated average inclination exceeds the threshold. Then, when the first adaptive optical controller 31 determines that the reflecting surface 51 of the first sub-deformable mirror 14 has a tip-tilt component exceeding the threshold, the first adaptive optical controller 31 may discard this random number matrix R and may repeatedly generate a random number matrix R until the distance between the center of gravity of the reflecting surface 51 corresponding to the generated random number matrix R and the center of the reflecting surface 51 becomes equal to or less than a threshold.

In addition, whether or not the reflecting surface 51 of the first sub-deformable mirror 14 has a tip-tilt component equal to or less than the threshold may be determined, when a barycentric position of the random number matrix R is calculated taking into consideration a spatial position when each component of the random number matrix R is made to correspond to the reflecting surface 51 instead of the above-described determination method, by determining that the reflecting surface 51 of the first sub-deformable mirror 14 has a tip-tilt component equal to or less than the threshold when the distance between the barycenter and the center of the reflecting surface 51 is equal to or less than a threshold, and determining that the reflecting surface 51 of the first sub-deformable mirror 14 has a tip-tilt component exceeding the threshold when the distance between the barycenter and the center of the reflecting surface 51 exceeds the threshold.

Similarly, the second adaptive optical controller 32 restricts the operating amount of randomly selected for each of the plurality of drive elements 53 of the first sub-deformable mirror 14 so that the shape of the reflecting surface 56 of the second sub-deformable mirror 15 defined by adding a second shape change amount to the second reference shape has a tip-tilt component equal to or less than the threshold.

The compensation for a tip-tilt component is performed by the tip-tilt controller 33 controlling the fast steering mirror 3. Therefore, the compensation for a second or higher order wavefront error in the Zernike polynomial shared by the first optimization operation by the first adaptive optical controller 31 and the second optimization operation by the second adaptive optical controller 32 can be effectively performed, and the control speed can be further improved.

Embodiment 7

A configuration and operation of an optical system 100 including an adaptive optical apparatus 1 according to Embodiment 7 will be described below, focusing on differences from Embodiment 1.

In the present embodiment, the first adaptive optical controller 31 executes a defocus correction operation at a predetermined cycle. The defocus correction operation is executed every time the first optimization operation is performed a predetermined number of times. Further, at this time, the defocus correction operation may be performed multiple times continuously.

In the defocus correction operation, the first adaptive optical controller 31 changes the shape of the reflecting surface 51 of the first sub-deformable mirror 14 from the first reference shape to a fifth shape in which a central portion of the reflecting surface 51 bulges in a dome shape, and then obtain light intensity detected by the first metric sensor 8. Then, the first adaptive optical controller 31 changes the shape of the reflecting surface 51 of the first sub-deformable mirror 14 to a sixth shape that is symmetrical to the fifth shape with respect to the first reference shape, and then obtain light intensity detected by the first metric sensor 8. Then, the first adaptive optical controller 31 changes the uneven shape of the reflecting surface of the first deformable mirror 4 toward one of the fifth shape and the sixth shape in which the light intensity detected by the first metric sensor 8 is high, thereby updating the uneven shape of the reflecting surface 21 of the first deformable mirror 4.

When setting the shape of the reflecting surface 51 of the first sub-deformable mirror 14 to the fifth shape, first, the first adaptive optical controller 31 calls Rd predefined and stored in the storage unit from the storage unit, instead of generating the random number matrix R in step S11. The matrix Rd is a matrix such that a value increases as it proceeds from the element of the matrix R corresponding to a drive element 23 disposed on a periphery of the reflecting surface 21 of the first deformable mirror 4 toward a drive element 23 disposed at a center, and elements of the matrix R corresponding to drive elements 23 arranged at a same distance from the center of the reflecting surface 21 of the first deformable mirror 4 are the same or substantially the same values as each other. Specifically, it is assumed that the first deformable mirror 4 has nine drive elements 23 arranged in a matrix of, for example, three rows and three columns. In this case, the matrix Rd is a 3-by-3 matrix, and each element is associated with a drive element having the same row number and column number. Then, Rd is, for example, a value expressed by equation (8).

[Equation 1]

$$R_d = \begin{pmatrix} a_{11} & a_{12} & a_{13} \\ a_{21} & a_{22} & a_{23} \\ a_{31} & a_{32} & a_{33} \end{pmatrix} = \begin{pmatrix} 0 & 0.3 & 0 \\ 0.3 & 1 & 0.3 \\ 0 & 0.3 & 0 \end{pmatrix} \quad (8)$$

Then, in step S12, $V_+$ is calculated based on the matrix Rd, and by the first adaptive optical controller 31 applying a voltage related to the element of $V_+$ corresponding to each drive element 53 to each drive element 53 of the first sub-deformable mirror 14, the reflecting surface 51 of the first sub-deformable mirror 14 exhibits a fifth shape that bulges outward in a dome shape, instead of the first shape.

Then, after executing the step S13, the first adaptive optical controller 31 calculates $V_-$ based on the matrix Rd in step S14, and by the first adaptive optical controller 31 applying a voltage related to the element of $V_-$ corresponding to each drive element 53 to each drive element 53 of the first sub-deformable mirror 14, the reflecting surface 51 of the first sub-deformable mirror 14 exhibits a sixth shape that bulges inward in a dome shape, instead of the second shape.

Then, the first adaptive optical controller 31 can perform compensation for a wavefront error of second-order defocus in the Zernike polynomial by executing steps S14 to S17 using Rd instead of R. As a result, compensation for a wavefront error of relatively low order can be effectively performed, and control speed can be further improved.

As described in Embodiments 1 to 7 above, an adaptive optical apparatus includes a first deformable mirror that includes a reflecting surface reflecting light having propagated through an atmosphere and a drive unit having a plurality of drive elements and changing an uneven shape of the reflecting surface, a second deformable mirror that includes a reflecting surface reflecting the light from the first deformable mirror and a drive unit having a plurality of drive elements and changing an uneven shape of the reflecting surface, an optical path splitting unit that splits the light from the second deformable mirror into a first optical path and a second optical path, a first sub-deformable mirror that is in the first optical path and includes a reflecting surface and a drive unit that correspond to the reflecting surface and the drive unit of the first deformable mirror, a second sub-deformable mirror that is in the second optical path and includes a reflecting surface and a drive unit that correspond to the reflecting surface and the drive unit of the second deformable mirror, a first detector that detects light intensity of the light from the first deformable mirror and the first sub-deformable mirror, a second detector that detects light intensity of the light from the second deformable mirror and the second sub-deformable mirror, and a controller that includes a first adaptive optical controller configured to execute a first optimization operation of controlling the drive unit of the first deformable mirror to update the uneven shape of the reflecting surface of the first deformable mirror based on a detected value of the first detector when the uneven shape of the reflecting surface of the first sub-deformable mirror is changed by controlling the drive unit of the first sub-deformable mirror, and a second adaptive optical controller configured to execute a second optimization operation of controlling the drive unit of the second deformable mirror to update the uneven shape of the reflecting surface of the second deformable mirror based on a detected value of the second detector when the uneven shape of the reflecting surface of the second sub-deformable mirror is changed by controlling the drive unit of the second sub-deformable mirror.

With this configuration, the control speed of the adaptive optical apparatus using the optimization method can be improved, the optimization method can be applied to compensation for a high-order optical wavefront following changes in fluctuations under conditions where atmospheric fluctuations are strong, ad the compensation for the high-order optical wavefront can be accurately performed.

The controller may repeatedly execute the first optimization operation and the second optimization operation.

With this configuration, it is possible to appropriately compensate for an optical wavefront.

In the first optimization operation, the controller may update the uneven shape of the reflecting surface of the first deformable mirror, thereafter determine whether or not the light intensity of the light detected by the first detector is equal to or less than a predetermined threshold, and execute a first initializing operation of updating the uneven shape of the reflecting surface of the first deformable mirror to a predetermined initial shape when the controller determines that the light intensity of the light detected by the first detector is equal to or less than the predetermined threshold, and in the second optimization operation, the controller may update the uneven shape of the reflecting surface of the second deformable mirror, thereafter determine whether or not the light intensity of the light detected by the second detector is equal to or less than a predetermined threshold, and execute a second initializing operation of updating the uneven shape of the reflecting surface of the second deformable mirror to a predetermined initial shape when the controller determines that the light intensity of the light detected by the second detector is equal to or less than the predetermined threshold.

With this configuration, it is possible to recover from a state of falling into a local optimum, and it is possible to prevent a state in which the degree of concentration has deteriorated from continuing.

A maximum displacement of one of the plurality of drive elements of the first deformable mirror and the plurality of drive elements of the second deformable mirror may be smaller than a maximum displacement amount of the other plurality thereof.

With this configuration, it is possible to efficiently share the order of a wavefront distortion in optical wavefront compensation.

The deformable mirror with the smaller maximum displacement may have more drive elements than the other deformable mirror.

With this configuration, it is possible to more efficiently share the order of the wavefront distortion in optical wavefront compensation.

A laser oscillator that oscillates laser light may further be included, in which the first detector and the second detector may detect light intensity of the laser light having passed through an optical path on an outgoing path side in which the oscillated laser light passes through the second deformable mirror and the first deformable mirror in this order and is emitted to an irradiated object outside and reaches the irradiated object as light having propagated through the atmosphere, and an optical path on a return path side in which the laser light reflected by the irradiated object is incident as the light having propagated through the atmosphere, and passes through the first deformable mirror and the second deformable mirror in this order, and optical paths of sections between the second deformable mirror and the irradiated object of the optical path on the outgoing path side and the optical path on the return path side may be the same optical paths.

With this configuration, by performing a compensation operation for correcting the influence of atmospheric fluctuations on the return path side, and accurately superposing the optical path on the outgoing path side and the optical path on the return side, similar compensation can be performed on the outgoing path side.

The adaptive optical apparatus may further include a high-power laser oscillator that oscillates high-power laser light having a power higher than that of the laser light, a first high-power laser detector that detects light intensity of the high-power laser light oscillated from the high-power laser oscillator and having passed through the optical path on the outgoing path side and the optical path on the return path side, a second high-power laser detector that detects light intensity of the high-power laser light oscillated from the high-power laser oscillator and having passed through the optical path on the outgoing path side and the optical path on the return path side, a first high-power laser light amount adjusting unit that adjusts a light amount of the high-power laser light incident on the first high-power laser detector, and a second high-power laser light amount adjusting unit that adjusts a light amount of the high-power laser light incident on the second high-power laser detector, in which the controller may be configured to be capable of controlling the first high-power laser light amount adjusting unit and the second high-power laser light amount adjusting unit, so as to execute a first light amount adjusting operation that is executed during execution of the first optimization operation so as to adjust a light amount of the high-power laser light incident on the first high-power laser detector so that the light intensity of the high-power laser light detected by the first high-power laser detector falls within a dynamic range of the first high-power laser detector, a first switching process, executed after completion of the first light amount adjusting operation, of switching, in the first optimization operation, an operation of controlling the drive unit of the first deformable mirror to change the uneven shape of the reflecting surface of the first deformable mirror based on a detected value by the first detector when the uneven shape of the reflecting surface of the first sub-deformable mirror is changed by controlling the drive unit of the first sub-deformable mirror, to an operation of controlling the drive unit of the first deformable mirror to change the uneven shape of the reflecting surface of the first deformable mirror based on a detected value by the first high-power laser detector when the uneven shape of the reflecting surface of the first sub-deformable mirror is changed by controlling the drive unit of the first sub-deformable mirror, a second light amount adjusting operation that is executed during execution of the second optimization operation so as to adjust a light amount of the high-power laser light incident on the second high-power laser detector so that the light intensity of the high-power laser light detected by the second high-power laser detector falls within a dynamic range of the second high-power laser detector, and a second switching process, executed after completion of the second light amount adjusting operation, of switching, in the second optimization operation, an operation of controlling the drive unit of the second deformable mirror to change the uneven shape of the reflecting surface of the second deformable mirror based on a detected value by the second detector when the uneven shape of the reflecting surface of the second sub-deformable mirror is changed by controlling the drive unit of the second sub-deformable mirror, to an operation of controlling the drive unit of the second deformable mirror to change the uneven shape of the reflecting surface of the second deformable mirror based on a detected value by the second high-power laser detector when the uneven shape of the reflecting surface of the second sub-deformable mirror is changed by controlling the drive unit of the second sub-deformable mirror.

With this configuration, it is possible to compensate for a wavefront error of the high power laser when starting high power laser irradiation. Further, compensation accuracy of the high power laser can be enhanced.

The adaptive optical apparatus may further include a wavefront shape detector that detects a wavefront shape of the light from the first deformable mirror and the second deformable mirror, in which the controller may further include a third adaptive optical controller that executes a wavefront correction operation to control the drive unit of the first deformable mirror based on a detected value by the wavefront shape detector to change the uneven shape of the reflecting surface of the first deformable mirror, in which the controller may execute the first optimization operation and the second optimization operation when the controller determines that intensity of am atmospheric fluctuation is equal to or greater than a predetermined value, and execute the wavefront correction operation when the controller determines that the intensity of the atmospheric fluctuation is less than the predetermined value.

With this configuration, under conditions where atmospheric fluctuations are weak and there is no possibility that a large step-like component is generated in the optical wavefront, or the like, an optical wavefront is compensated by the wavefront correction operation, and thus a margin can be added to the processing speed.

In the first optimization operation, the first adaptive optical controller may change the uneven shape of the reflecting surface of the first sub-deformable mirror from a predetermined first reference shape to a first shape, and obtain light intensity detected by the first detector, and change the uneven shape of the reflecting surface of the first sub-deformable mirror to a second shape symmetrical to the first shape with respect to the first reference shape, and obtain light intensity detected by the first detector, and change the uneven shape of the reflecting surface of the first deformable mirror toward one shape with higher light intensity detected by the first detector out of the first shape and the second shape, thereby updating the uneven shape of the reflecting surface of the first deformable mirror, and in the second optimization operation, the second adaptive optical controller may change the uneven shape of the reflecting surface of the second sub-deformable mirror from a predetermined second reference shape to a third shape, and obtain light intensity detected by the second detector, and change the uneven shape of the reflecting surface of the second sub-deformable mirror to a fourth shape symmetrical to the third shape with respect to the second reference shape, and obtain light intensity detected by the second detector, and change the uneven shape of the reflecting surface of the second deformable mirror toward one shape with higher light intensity detected by the second detector out of the third shape and the fourth shape, thereby updating the uneven shape of the reflecting surface of the second deformable mirror.

With this configuration, it is possible to appropriately compensate for an optical wavefront using the optimization method.

The first shape may be a shape defined by adding to the first reference shape a first shape change amount randomly selected every time the first optimization operation is executed on a plurality of the drive units constituting the first sub-deformable mirror, and the third shape may be a shape defined by adding to the second reference shape a second shape change amount randomly selected every time the second optimization operation is executed on a plurality of the drive units constituting the second sub-deformable mirror.

With this configuration, it is possible to effectively prevent falling into a local optimum in compensation of the optical wavefront using the optimization method.

The first shape change amount may be defined by the randomly selected operating amount for each of the plurality of drive elements of the first sub-deformable mirror, and the second shape change amount may be defined by the randomly selected operating amount for each of the plurality of drive elements of the second sub-deformable mirror.

With this configuration, the optimization operation can be appropriately configured.

The first adaptive optical controller may restrict an operating amount randomly selected for each of the plurality of drive elements of the first sub-deformable mirror so that the shape of the reflecting surface of the first sub-deformable mirror defined by adding the first shape change amount to the first reference shape has a tip-tilt component equal to or less than a threshold, and the second adaptive optical controller may restrict an operating amount randomly selected for each of the plurality of drive elements of the second sub-deformable mirror so that the shape of the reflecting surface of the second sub-deformable mirror defined by adding the second shape change amount to the second reference shape has a tip-tilt component equal to or less than a threshold.

With this configuration, the control speed can be further improved.

The first adaptive optical controller may be configured to be capable of executing a defocus correction operation of changing the uneven shape of the reflecting surface of the first sub-deformable mirror from the first reference shape to a fifth shape in which the reflecting surface bulges in a dome shape and obtaining light intensity detected by the first detector, changing the uneven shape of the reflecting surface of the first sub-deformable mirror to a sixth shape symmetrical to the fifth shape with respect to the first reference shape and obtaining light intensity detected by the first detector, and changing the uneven shape of the reflecting surface of the first deformable mirror toward one shape with higher light intensity detected by the first detector out of the fifth shape and the sixth shape, thereby updating the uneven shape of the reflecting surface of the first deformable mirror, and the first adaptive optical controller may execute the defocus correction operation at a predetermined cycle.

With this configuration, compensation for a wavefront error of relatively low order can be effectively performed, and the control speed can be further improved.

Further, an optical system may be an optical system including the adaptive optical apparatus and a compensation result evaluation apparatus, in which the compensation result evaluation apparatus may include a deformable mirror for evaluation that includes a reflecting surface and a drive unit having a plurality of drive elements and changing an uneven shape of the reflecting surface, a detector for evaluation that detects light intensity of the laser light reflected by the irradiated object, incident as light having propagated through the atmosphere, and passed through an optical path passing through the deformable mirror for evaluation, and a controller for evaluation that controls the drive unit of the deformable mirror for evaluation, in which the controller for evaluation may be configured to be capable of executing an imaging operation of changing the uneven shape of the reflecting surface of the deformable mirror for evaluation so that the light intensity of the laser light detected by the detector for evaluation becomes strong, and the first optimization operation may be an operation of controlling the drive unit of the first deformable mirror to update the uneven shape of the reflecting surface of the first deformable mirror based on a detected value by the detector for evaluation in addition to a detection value by the first detector when the uneven shape of the reflecting surface of the first sub-deformable mirror is changed by controlling the drive unit of the first sub-deformable mirror.

With this configuration, it is possible to more quickly improve light collection performance of laser light.

The functionality of the elements disclosed herein may be implemented using circuitry or processing circuitry which includes general purpose processors, special purpose processors, integrated circuits, ASICs ("Application Specific Integrated Circuits"), conventional circuitry, controllers, and/or combinations thereof which are configured or programmed to perform the disclosed functionality. Processors and controllers are considered processing circuitry or circuitry as they include transistors and other circuitry therein. In the disclosure, the circuitry, units, controllers, or means are hardware that carry out or are programmed to perform the recited functionality. The hardware may be any hardware disclosed herein or otherwise known which is programmed or configured to carry out the recited functionality. When the hardware is a processor or controller which may be considered a type of circuitry, the circuitry, means, or units are a combination of hardware and software, the software being used to configure the hardware and/or processor.

From the above description, many improvements and other embodiments of the present invention will be apparent to those skilled in the art. Accordingly, the above description should be taken as exemplary only, and is provided for the purpose of teaching those skilled in the art the best mode for carrying out the present invention. The structural and/or functional details may be substantially altered without departing from the spirit of the present invention.

REFERENCE SIGN LIST

L1 first optical path
L2 second optical path
1 adaptive optical apparatus
4 first deformable mirror
5 second deformable mirror
8 first metric sensor
9 second metric sensor
13 third beam splitter
14 first sub-deformable mirror
15 second sub-deformable mirror
21 reflecting surface (of the first deformable mirror)
22 drive unit (of the first deformable mirror)
23 drive element (of the first deformable mirror)
26 reflecting surface (of the second deformable mirror)
27 drive unit (of the second deformable mirror)
28 drive element (of the second deformable mirror)
31 first adaptive optical controller
32 second adaptive optical controller
51 reflecting surface (of the first sub-deformable mirror)
52 drive unit (of the first sub-deformable mirror)
53 drive element (of the first sub-deformable mirror)
56 reflecting surface (of the second sub-deformable mirror)
57 drive unit (of the second sub-deformable mirror)
58 drive element (of the second sub-deformable mirror)
100 optical system

The invention claimed is:

1. An adaptive optical apparatus comprising:
a first deformable mirror including a corresponding reflecting surface to reflect light having propagated through an atmosphere and drive elements to change a shape of the corresponding reflecting surface;
a second deformable mirror including a corresponding reflecting surface to reflect the light from the first deformable mirror and drive elements to change a shape of the corresponding reflecting surface;
an optical path splitter to split the light from the second deformable mirror into a first optical path and a second optical path;
a first sub-deformable mirror in the first optical path and including a corresponding reflecting surface and drive elements to change a shape of the corresponding reflecting surface;
a second sub-deformable mirror in the second optical path and including a corresponding reflecting surface and drive elements to change a shape of the corresponding reflecting surface;
a first detector that detects a light intensity of the light from the first deformable mirror and the first sub-deformable mirror;
a second detector that detects a light intensity of the light from the second deformable mirror and the second sub-deformable mirror; and
circuitry configured to:
execute a first optimization operation to control the drive elements of the first deformable mirror to update the shape of the reflecting surface of the first deformable mirror based on a detected value of the first detector when the shape of the reflecting surface of the first sub-deformable mirror is changed by controlling the drive elements of the first sub-deformable mirror; and execute a second optimization operation to control the drive elements of the second deformable mirror to update the shape of the reflecting surface of the second deformable mirror based on a detected value of the second detector when the shape of the reflecting surface of the second sub-deformable mirror is changed by controlling the drive elements of the second sub-deformable mirror.

2. The adaptive optical apparatus according to claim 1, wherein the circuitry repeatedly executes the first optimization operation and the second optimization operation.

3. The adaptive optical apparatus according to claim 2, wherein:
the first optimization operation updates the shape of the reflecting surface of the first deformable mirror, thereafter determines whether the light intensity of the light detected by the first detector is equal to or less than a first predetermined threshold, and executes a first initializing operation of updating the shape of the reflecting surface of the first deformable mirror to a predetermined initial shape when the light intensity of the light detected by the first detector is equal to or less than the first predetermined threshold, and
the second optimization operation updates the shape of the reflecting surface of the second deformable mirror, thereafter determines whether or not the light intensity of the light detected by the second detector is equal to or less than a second predetermined threshold, and executes a second initializing operation of updating the shape of the reflecting surface of the second deformable mirror to a predetermined initial shape when the light intensity of the light detected by the second detector is equal to or less than the second predetermined threshold.

4. The adaptive optical apparatus according to any one of claim 1, wherein:
a maximum displacement of the drive elements of the first deformable mirror is different from a maximum displacement of the drive elements of the second deformable mirror.

5. The adaptive optical apparatus according to claim 4, further comprising:
a laser oscillator that oscillates laser light, wherein
the first detector and the second detector detect light intensity of the laser light having passed through an optical path on an outgoing path side in which the oscillated laser light passes through the second deformable mirror and the first deformable mirror in this order and is emitted to an irradiated object and reaches the irradiated object as light having propagated through the atmosphere, and an optical path on a return path side in which the laser light reflected by the irradiated object is incident as the light having propagated through the atmosphere, and passes through the first deformable mirror and the second deformable mirror in this order, and
optical paths of sections between the second deformable mirror and the irradiated object of the optical path on the outgoing path side and the optical path on the return path side are the same optical paths.

6. The adaptive optical apparatus according to claim 5, further comprising:
another laser oscillator that oscillates power laser light having a power higher than that of the laser light;
a first another laser detector that detects light intensity of the laser light oscillated from the another laser oscillator and having passed through the optical path on the outgoing path side and the optical path on the return path side;
a second another laser detector that detects light intensity of the another laser light oscillated from the another laser oscillator and having passed through the optical path on the outgoing path side and the optical path on the return path side;
a first another laser light attenuator that adjusts a light amount of the another laser light incident on the first another laser detector; and
a second another laser light attenuator that adjusts a light amount of the another laser light incident on the second another laser detector, wherein
the circuitry is configured to control the first another laser light attenuator and the second another laser light attenuator, to execute:
a first light amount adjusting operation that is executed during execution of the first optimization operation to adjust a light amount of the another laser light incident on the first another laser detector so that the light intensity of the another laser light detected by the first another laser detector falls within a dynamic range of the first another laser detector;
a first switching process, executed after completion of the first light amount adjusting operation, of switching, in the first optimization operation, an operation of controlling the drive elements of the first deformable mirror to change the shape of the reflecting surface of the first deformable mirror based on a detected value by the first detector when the shape of the reflecting surface of the first sub-deformable mirror is changed by controlling the drive elements of the first sub-deformable mirror, to an operation of controlling the drive elements of the first deformable mirror to change the shape of the reflecting surface of the first deformable mirror based on a detected value by the first another laser detector when the shape of the reflecting surface of the first sub-deformable mirror is changed by controlling the drive elements of the first sub-deformable mirror;
a second light amount adjusting operation that is executed during execution of the second optimization operation to adjust a light amount of the another laser light incident on the second another laser detector so that the light intensity of the another laser light detected by the second another laser detector falls within a dynamic range of the second another laser detector; and
a second switching process, executed after completion of the second light amount adjusting operation, of switching, in the second optimization operation, an operation of controlling the drive elements of the second deformable mirror to change the uneven shape of the reflecting surface of the second deformable mirror based on a detected value by the second detector when the uneven shape of the reflecting surface of the second sub-deformable mirror is changed by controlling the drive elements of the second sub-deformable mirror, to an operation of controlling the drive elements of the second deformable mirror to change the uneven shape of the reflecting surface of the second deformable mirror based on a detected value by the second another laser detector when the uneven shape of the reflecting surface of the second sub-deformable mirror is changed by controlling the drive elements of the second sub-deformable mirror.

7. The adaptive optical apparatus according to claim 1, further comprising:
a wavefront shape detector that detects a wavefront shape of the light from the first deformable mirror and the second deformable mirror,
wherein the circuitry is further configured to execute:
a wavefront correction operation to control the drive elements of the first deformable mirror based on a detected value by the wavefront shape detector to change the uneven shape of the reflecting surface of the first deformable mirror,
wherein the circuitry is configured to execute the first optimization operation and the second optimization operation when an intensity of an atmospheric fluctuation is equal to or greater than a predetermined value, and executes the wavefront correction operation when the intensity of the atmospheric fluctuation is less than the predetermined value.

8. The adaptive optical apparatus according to claim 1, wherein
in the first optimization operation, the circuitry changes the shape of the reflecting surface of the first sub-deformable mirror from a predetermined first reference shape to a first shape, and obtains light intensity detected by the first detector, and changes the shape of the reflecting surface of the first sub-deformable mirror to a second shape symmetrical to the first shape with respect to the first reference shape, and obtains light intensity detected by the first detector, and changes the shape of the reflecting surface of the first deformable mirror toward one shape with higher light intensity detected by the first detector out of the first shape and the second shape, to update the uneven shape of the reflecting surface of the first deformable mirror, and
in the second optimization operation, the circuitry changes the shape of the reflecting surface of the second sub-deformable mirror from a predetermined second reference shape to a third shape, and obtains light intensity detected by the second detector, and changes the shape of the reflecting surface of the second sub-deformable mirror to a fourth shape symmetrical to the third shape with respect to the second reference shape, and obtains light intensity detected by the second detector, and changes the uneven shape of the reflecting surface of the second deformable mirror toward one shape with higher light intensity detected by the second detector out of the third shape and the fourth shape, to update the uneven shape of the reflecting surface of the second deformable mirror.

9. The adaptive optical apparatus according to claim 8, wherein
the first shape is a shape defined by adding to the first reference shape a first shape change amount randomly selected every time the first optimization operation is executed on the drive elements of the first sub-deformable mirror, and
the third shape is a shape defined by adding to the second reference shape a second shape change amount randomly selected every time the second optimization operation is executed on the drive elements of the second sub-deformable mirror.

10. The adaptive optical apparatus according to claim 9, wherein
the first shape change amount is defined by the randomly selected operating amount for each of the drive elements of the first sub-deformable mirror, and
the second shape change amount is defined by the randomly selected operating amount for each of the drive elements of the second sub-deformable mirror.

11. The adaptive optical apparatus according to claim 10, wherein the circuitry is further configured to:
restrict an operating amount randomly selected for each of the drive elements of the first sub-deformable mirror so that the shape of the reflecting surface of the first sub-deformable mirror defined by adding the first shape change amount to the first reference shape has a tip-tilt component equal to or less than a threshold, and
restrict an operating amount randomly selected for each of the drive elements of the second sub-deformable mirror so that the shape of the reflecting surface of the second sub-deformable mirror defined by adding the second shape change amount to the second reference shape has a tip-tilt component equal to or less than a threshold.

12. The adaptive optical apparatus according to claim 8, wherein the circuitry is further configured to:
execute a defocus correction operation of changing the uneven shape of the reflecting surface of the first sub-deformable mirror from the first reference shape to a fifth shape in which the reflecting surface bulges in a dome shape and obtaining light intensity detected by the first detector, changing the uneven shape of the reflecting surface of the first sub-deformable mirror to a sixth shape symmetrical to the fifth shape with respect to the first reference shape and obtaining light intensity detected by the first detector, and changing the uneven shape of the reflecting surface of the first deformable mirror toward one shape with higher light intensity detected by the first detector out of the fifth shape and the sixth shape, to update the uneven shape of the reflecting surface of the first deformable mirror, and
execute the defocus correction operation at a predetermined cycle.

13. An optical system, comprising:
the adaptive optical apparatus according to claim 5, and
a compensation result evaluation apparatus, comprising:
a deformable mirror for evaluation that includes a reflecting surface and drive elements to change an uneven shape of the reflecting surface; and
a detector for evaluation that detects light intensity of the laser light reflected by the irradiated object, incident as light having propagated through the atmosphere, and passed through an optical path passing through the deformable mirror for evaluation,
wherein the circuitry is configured to:
control the drive elements of the deformable mirror for evaluation; and
execute an imaging operation of changing the shape of the reflecting surface of the deformable mirror for evaluation so that the light intensity of the laser light detected by the detector for evaluation increases,
wherein the first optimization operation is an operation of controlling the drive elements of the first deformable mirror to update the shape of the reflecting surface of the first deformable mirror based on a detected value by the detector for evaluation in addition to a detection value by the first detector when the uneven shape of the reflecting surface of the first sub-deform able mirror is changed by controlling the drive elements of the first sub-deformable mirror.

14. The adaptive optical apparatus according to claim 1, wherein:
the first deformable mirror further includes circuitry configured to drive the drive elements thereof, the second deformable mirror further includes circuitry configured to drive the drive elements thereof, the first sub-deformable mirror further includes circuitry configured to drive the drive elements thereof, and the second sub-deformable mirror further includes circuitry configured to drive the drive elements thereof.

15. An optical wavefront compensation method, comprising:

controlling drive elements of a first deformable mirror to update a shape of a reflecting surface of the first deformable mirror based on a detected light intensity of light from the first deformable mirror and a first sub-deformable mirror when the reflecting surface of the first sub-deformable mirror is changed; and controlling drive elements of a second deformable mirror to update a shape of a reflecting surface of the second deformable mirror based on a detected light intensity of light from the first deformable mirror and a second sub-deformable mirror when the reflecting surface of the second sub-deformable mirror is changed.

16. The method according to claim 15, further comprising:

repeatedly executing the controlling of the drive elements of the first deformable mirror and the second deformable mirror.

17. The method according to claim 16, wherein:

the controlling the drive elements of the first deformable mirror includes updating the shape of the reflecting surface of the first deformable mirror, thereafter determining whether the detected light intensity of the light from the first deformable mirror and the first sub-deformable mirror is equal to or less than a first predetermined threshold, and executing a first initializing operation of updating the shape of the reflecting surface of the first deformable mirror to a predetermined initial shape when the detected light intensity of the light from the first deformable mirror and the first sub-deformable mirror is equal to or less than the first predetermined threshold, and the controlling the drive elements of the second deformable mirror includes updating the shape of the reflecting surface of the second deformable mirror, thereafter determining whether the detected light intensity of the light from the second deformable mirror and the second sub-deformable mirror is equal to or less than a second predetermined threshold, and executing a second initializing operation of updating the shape of the reflecting surface of the second deformable mirror to a predetermined initial shape when the detected light intensity of the light from the second deformable mirror and the second sub-deformable mirror is equal to or less than the second predetermined threshold.

18. The method according to claim 15, wherein:

a maximum displacement of the drive elements of the first deformable mirror is different from a maximum displacement of the drive elements of the second deformable mirror.

19. The method according to claim 18, further comprising:

generating laser light, wherein a first detector that detects light intensity from the first deformable mirror and a second detector that detects light intensity from the second deformable mirror detect light intensity of the laser light having passed through an optical path on an outgoing path side in which the laser light passes through the second deformable mirror and the first deformable mirror in this order and is emitted to an irradiated object and reaches the irradiated object as light having propagated through the atmosphere, and an optical path on a return path side in which the laser light reflected by the irradiated object is incident as the light having propagated through the atmosphere, and passes through the first deformable mirror and the second deformable mirror in this order, and optical paths of sections between the second deformable mirror and the irradiated object of the optical path on the outgoing path side and the optical path on the return path side are the same optical paths.

20. An adaptive optical apparatus comprising:

a first deformable mirror including a corresponding reflecting surface to reflect light having propagated through an atmosphere and drive elements to change a shape of the corresponding reflecting surface;

a second deformable mirror including a corresponding reflecting surface to reflect the light from the first deformable mirror and drive elements to change a shape of the corresponding reflecting surface;

an optical path splitter to split the light from the second deformable mirror into a first optical path and a second optical path;

a first sub-deformable mirror in the first optical path and including a corresponding reflecting surface and drive elements to change a shape of the corresponding reflecting surface;

a second sub-deformable mirror in the second optical path and including a corresponding reflecting surface and drive elements to change a shape of the corresponding reflecting surface;

a first detector that detects a light intensity of the light from the first deformable mirror and the first sub-deformable mirror;

a second detector that detects a light intensity of the light from the second deformable mirror and the second sub-deformable mirror;

means for executing a first optimization operation to control the drive elements of the first deformable mirror to update the shape of the reflecting surface of the first deformable mirror based on a detected value of the first detector when the shape of the reflecting surface of the first sub-deformable mirror is changed by controlling the drive elements of the first sub-deformable mirror; and means for executing a second optimization operation to control the drive elements of the second deformable mirror to update the shape of the reflecting surface of the second deformable mirror based on a detected value of the second detector when the shape of the reflecting surface of the second sub-deformable mirror is changed by controlling the drive elements of the second sub-deformable mirror.

* * * * *